United States Patent
O'Brien et al.

(10) Patent No.: US 12,508,901 B2
(45) Date of Patent: *Dec. 30, 2025

(54) ACCESSORY ROTARY DRIVE SYSTEM AND METHOD

(71) Applicant: TSI Products, Inc., Arlington, TX (US)

(72) Inventors: Stephen William O'Brien, Irving, TX (US); Todd Michael Coleman, The Colony, TX (US); Christopher Delmont Corfman, Grapevine, TX (US); Kerry Wayne Whitaker, Gordonville, TX (US); Charles J. Martis, Los Alamos, NM (US)

(73) Assignee: TSI Products, Inc., Arlington, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,457

(22) Filed: Apr. 11, 2024

(65) Prior Publication Data

US 2024/0253461 A1 Aug. 1, 2024

Related U.S. Application Data

(63) Continuation of application No. 17/843,813, filed on Jun. 17, 2022, now Pat. No. 11,981,201, which is a (Continued)

(51) Int. Cl.
*B60K 25/02* (2006.01)
*F02B 63/04* (2006.01)
(Continued)

(52) U.S. Cl.
CPC ........... *B60K 25/02* (2013.01); *F16H 7/1281* (2013.01); *F16H 37/065* (2013.01);
(Continued)

(58) Field of Classification Search
CPC . B60K 25/02; B60K 2025/022; F16H 7/1281; F16H 37/065; F16H 57/0416;
(Continued)

(56) References Cited

U.S. PATENT DOCUMENTS 2,079,724 A * 5/1937 Van Ranst ............... F02B 77/14
 123/195 A
2,511,908 A * 6/1950 Forbess ..................... F02N 3/02
 192/81 C
(Continued)

FOREIGN PATENT DOCUMENTS

CN 105074163 A 11/2015

*Primary Examiner* — Henry Y Liu
(74) *Attorney, Agent, or Firm* — Hitchcock Evert LLP

(57) ABSTRACT

A drive mechanism that connects to a rotary drive component for transferring rotary motion to another component. The drive mechanism may be a conversion assembly to facilitate a connection to an existing rotary drive component and transfer the rotary motion to another component. The drive mechanism may include a drive shaft, a housing with a rotary bearing and seal, an enclosure and a drive pulley or other transfer component. The drive shaft may include a cap and flange to connect to a rotary drum and extend to a drive pulley in an enclosure.

9 Claims, 18 Drawing Sheets

Related U.S. Application Data continuation-in-part of application No. PCT/US2020/065564, filed on Dec. 17, 2020.

(60) Provisional application No. 63/214,063, filed on Jun. 23, 2021, provisional application No. 63/043,642, filed on Jun. 24, 2020, provisional application No. 62/950,051, filed on Dec. 18, 2019.

(51) Int. Cl.
   *F02B 67/06* (2006.01)
   *F16H 7/12* (2006.01)
   *F16H 37/06* (2006.01)

(52) U.S. Cl.
   CPC ....... *B60K 2025/022* (2013.01); *F02B 63/042* (2013.01); *F02B 67/06* (2013.01)

(58) Field of Classification Search
   CPC ............. F16H 57/035; F16H 57/0489; F16H 2057/02034; F02B 63/042; F02B 67/04
   USPC .......................................................... 474/86
   See application file for complete search history.

(56) References Cited

U.S. PATENT DOCUMENTS

| | | | | |
|---|---|---|---|---|
| 2,910,891 A * | 11/1959 | Heckethorn | ............ | F01P 7/046 474/169 |
| 2,911,962 A * | 11/1959 | Mcrae | ............ | F01P 7/046 123/195 A |
| 4,304,501 A * | 12/1981 | Gordon | ............ | F16D 1/101 464/154 |
| 4,307,583 A * | 12/1981 | Hall | ............ | F02B 67/04 123/195 A |
| 4,502,345 A * | 3/1985 | Butterfield | ............ | F01P 7/046 474/69 |
| 4,598,677 A * | 7/1986 | Mongin | ............ | F16D 1/101 123/195 A |
| 4,674,612 A * | 6/1987 | Ogura | ............ | F16H 3/54 192/81 C |
| 4,795,403 A * | 1/1989 | Heine | ............ | F16D 3/12 464/180 |
| 4,977,870 A * | 12/1990 | Hashimoto | ............ | F01M 13/04 123/196 R |
| 4,998,903 A * | 3/1991 | Bolli | ............ | A63H 31/10 446/128 |
| 5,000,142 A * | 3/1991 | Aruga | ............ | F02F 7/0065 123/195 C |
| 5,314,319 A * | 5/1994 | Nilsson | ............ | F01M 1/02 418/133 |
| 6,009,609 A * | 1/2000 | Hanno | ............ | F16D 1/116 464/154 |
| 6,164,262 A * | 12/2000 | Ban | ............ | B60K 25/02 123/196 R |
| 6,167,782 B1 * | 1/2001 | Chevalier | ............ | F16F 15/1207 474/237 |
| 6,244,239 B1 * | 6/2001 | Sisco | ............ | F02F 7/0073 123/195 A |
| 6,381,933 B1 * | 5/2002 | Wanner | ............ | F16D 1/05 464/88 |
| 7,044,100 B2 * | 5/2006 | Stone | ............ | F01L 1/053 123/198 R |
| 7,086,369 B2 * | 8/2006 | Stone | ............ | F01L 1/053 123/90.15 |
| 7,194,994 B1 * | 3/2007 | Chisenhall | ............ | F02F 7/0068 123/195 A |
| 7,628,142 B2 * | 12/2009 | Hayman | ............ | F02B 67/00 123/198 C |
| 7,665,441 B2 * | 2/2010 | Stone | ............ | F01L 1/053 123/195 A |
| 7,717,080 B1 * | 5/2010 | Grozich | ............ | F16H 7/1281 248/220.21 |
| 8,028,671 B1 * | 10/2011 | Grozich | ............ | F02B 67/06 248/220.21 |
| 8,387,727 B2 * | 3/2013 | Potter | ............ | B60K 25/06 180/53.7 |
| 8,636,127 B2 * | 1/2014 | Schultheiss | ............ | F16D 35/024 192/58.61 |
| 8,783,995 B2 * | 7/2014 | Besler | ............ | B60K 7/0015 403/359.1 |
| 9,347,363 B2 * | 5/2016 | Barnes | ............ | F01P 5/04 |
| 9,410,472 B2 * | 8/2016 | Gacka | ............ | F01P 5/12 |
| 11,162,415 B2 * | 11/2021 | O'Brien | ............ | H02K 7/003 |
| 11,981,201 B2 * | 5/2024 | O'Brien | ............ | B60K 25/02 |
| 2005/0003916 A1 * | 1/2005 | Miyata | ............ | F02B 67/06 474/148 |
| 2005/0121988 A1 * | 6/2005 | Howe | ............ | H02K 5/15 310/90 |
| 2005/0153813 A1 * | 7/2005 | Serkh | ............ | B60K 25/00 475/324 |
| 2006/0145643 A1 * | 7/2006 | Brunetiere | ............ | F02N 11/04 318/432 |
| 2006/0276284 A1 * | 12/2006 | Lancaster | ............ | F16H 7/1263 474/133 |
| 2013/0008758 A1 * | 1/2013 | Komorowski | ............ | F16D 27/105 192/89.27 |
| 2013/0313068 A1 * | 11/2013 | Mevissen | ............ | B60K 25/00 192/81 C |
| 2014/0231400 A1 * | 8/2014 | Bankstahl | ............ | B23K 9/32 219/133 |
| 2019/0186592 A1 * | 6/2019 | Broughton | ............ | F02B 63/042 |

* cited by examiner

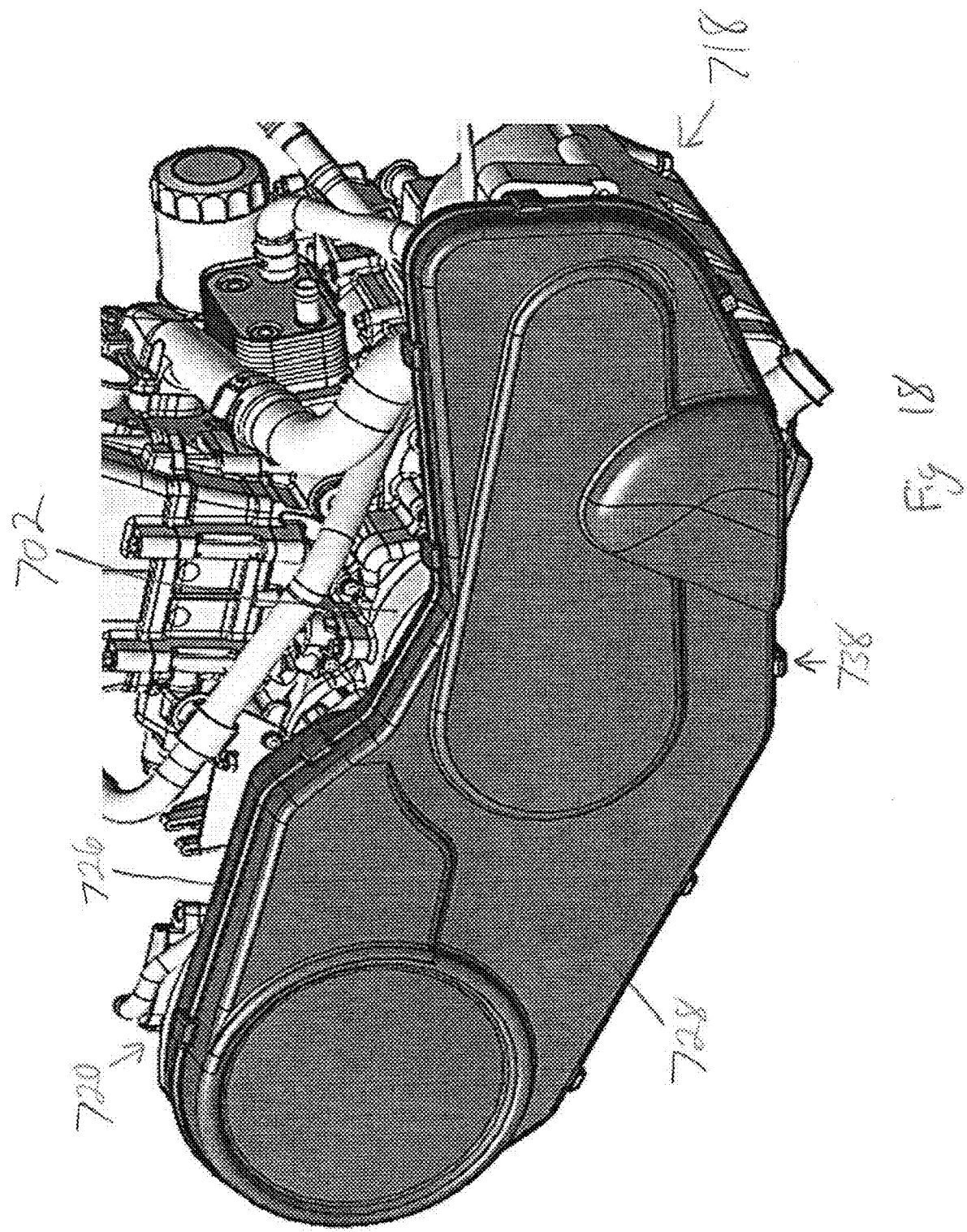

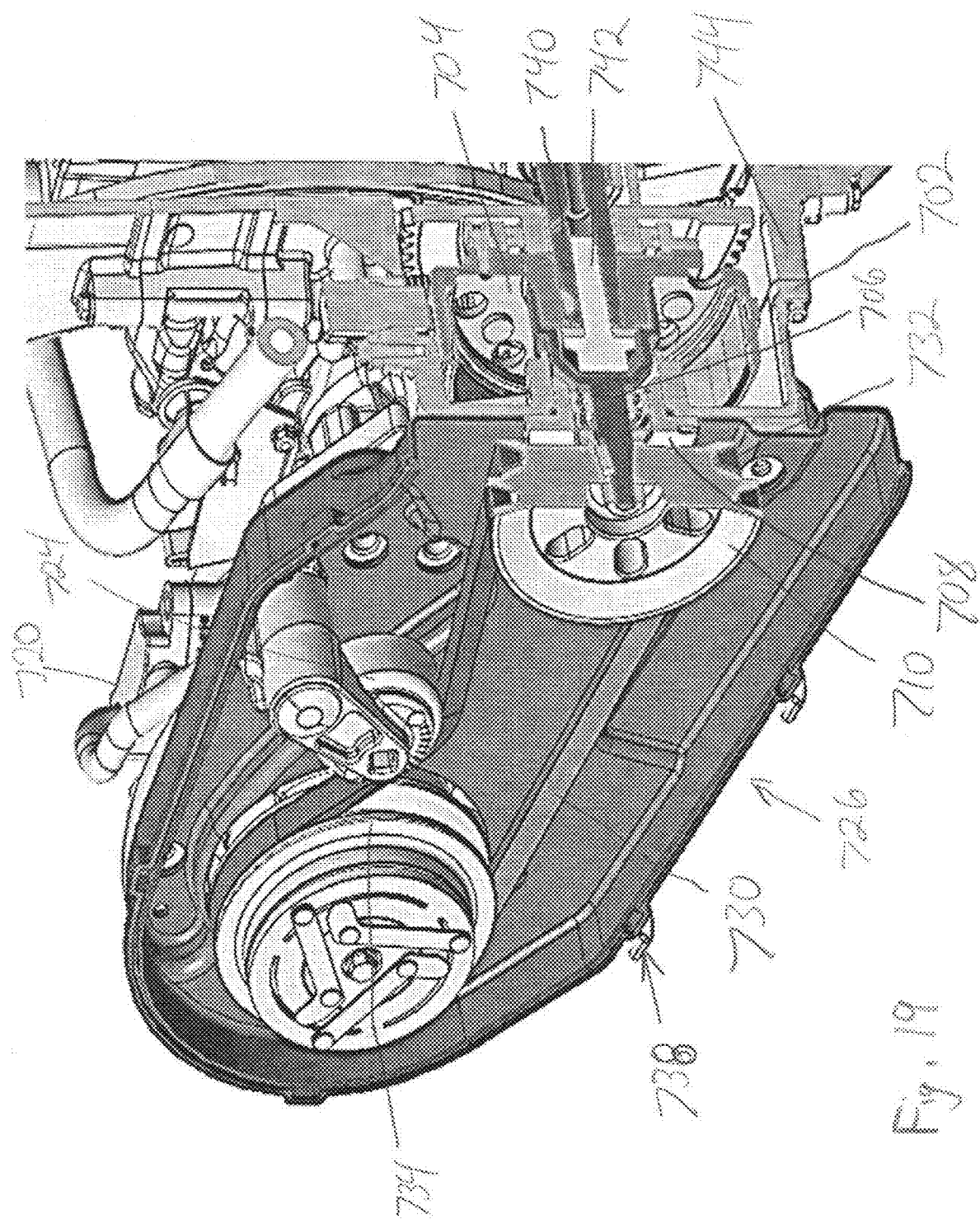

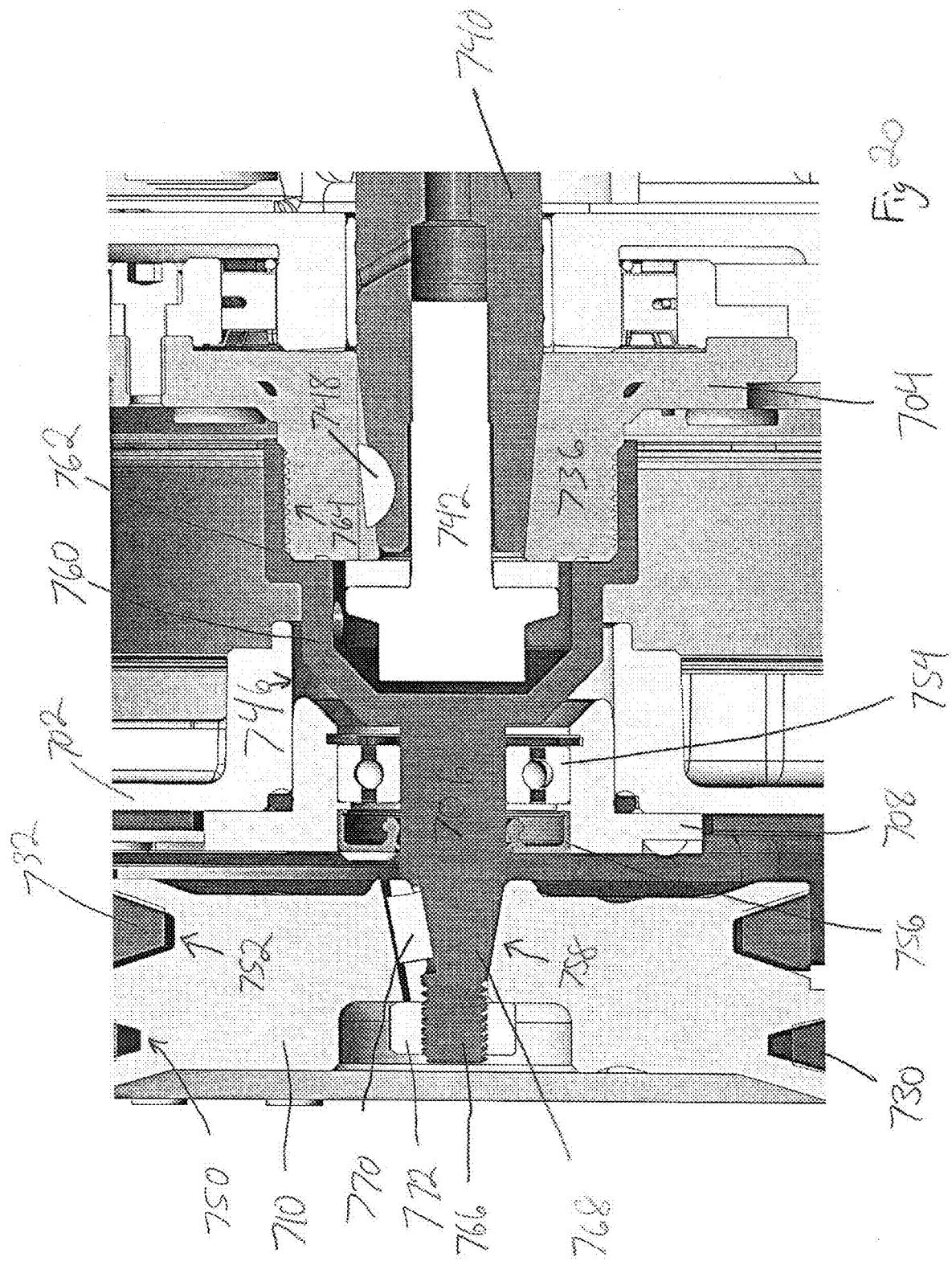

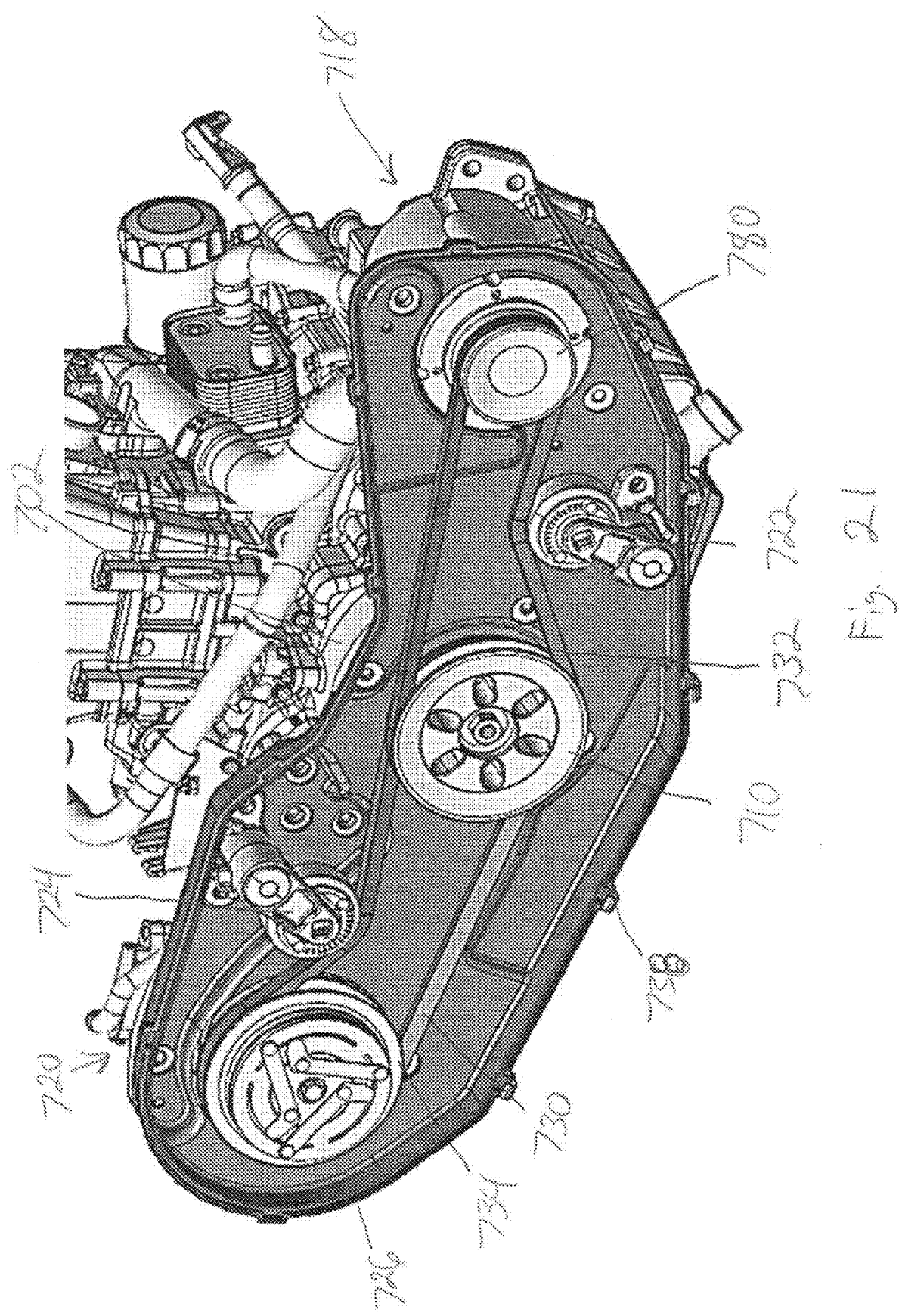

ACCESSORY ROTARY DRIVE SYSTEM AND METHOD

CROSS-REFERENCE TO RELATED APPLICATION

This application is a continuation of U.S. application Ser. No. 17/843,813 filed on Jun. 17, 2022, which claims the benefit of priority from U.S. Provisional Application No. 63/214,063 filed on Jun. 23, 2021 titled "Accessory Rotary Drive System and Method," and PCT Application No. PCT/US2020/065564 filed on Dec. 17, 2020 titled "Drive Mechanism and Accessory System," which claims priority to U.S. Provisional Application No. 62/950,051 filed on Dec. 18, 2019 and U.S. Provisional Application No. 63/043,642 filed on Jun. 24, 2020. All of which are incorporated herein by reference.

FIELD OF THE DISCLOSURE

The invention relates generally to drive systems, including vehicle drive systems.

BACKGROUND

Vehicles typically have a number of drive systems and components that operate off of drive systems. For example, a vehicle includes a drive system for turning wheels. Vehicles often include a built-in belt or other system to drive other components that use the engine's rotation, such as a water pump, electrical alternator, power steering system, air conditioning condenser, etc.

Some vehicles may not be designed to facilitate additional rotary drive powered components and existing rotary components may not be accessible to obtain drive power. Adding further components has become increasingly difficult as the space within vehicles has compressed. This is an even greater challenge in smaller vehicles—such as small automobiles, all-terrain vehicles (ATVs), boats, tractors, farm equipment, golf carts, utility vehicles, side-by-side vehicles, etc.

In addition, some drive components only engage when the vehicle is in gear and the drive components are not rotating while idling. This further limits the options for accessing a usable rotary component to drive an accessory device while the vehicle is idling.

SUMMARY

The present disclosure provides a drive mechanism that connects into an existing rotary component. The drive mechanism may be connected to a rotary driven accessory component to facilitate the accessory component's operation.

The drive mechanism may include a drive shaft configured to attach to a rotary component in an engine system. The drive shaft may replace an existing component—such as a bolt, screw or other connector—that rotates with a rotary component.

In some embodiments, the drive mechanism includes a support structure configured to fit in an existing component's housing and provides support to the drive shaft extending through the support structure. The support structure may include a housing, a rotary bearing and a seal. The housing may be configured to fit in a port in the existing component's housing. The seal may be configured to hold the rotary bearing in place within the housing. The rotary bearing keeps the drive shaft in position while allowing it to rotate freely within the opening.

In some embodiments, a drive pulley, gear or other drive wheel component may be attached to the second end of the drive shaft. The second end of the drive shaft may be shaped to engage the drive pulley wheel. In some embodiments, the drive shaft may include a channel and the drive pulley wheel may include a channel. A key or other mechanical connector may be configured to fit both channels to ensure the drive pulley wheel rotates with the drive shaft.

In some embodiments, the drive pulley wheel is connected to a pulley wheel of an air conditioning compressor by a drive belt. As the drive pulley wheel turns, it causes the drive belt, and therefore the compressor's pulley wheel, to rotate. Because a compressor is integral to an air conditioning system, the converted drive shaft allows for an air conditioning system to be installed. The drive shaft conversion may also allow one or more alternative or additional accessories to be installed, such as an electrical alternator or hydraulic pump for powering an implement.

Some embodiments may include a tensioner to apply tension to a drive belt between the drive pulley and an accessory component, such as a compressor. The tensioner may be a self-adjusting or manual adjustment tensioner. In some embodiments, the system may include multiple accessories connected by a drive belt with one or more tensioners to maintain proper tension on the belt as it passes between pulleys.

Some embodiments include arms that connect to a replacement housing for an alternator. A top arm may extend from a top on one side of the replacement housing to an accessory device, such as a compressor. A bottom arm may extend from the bottom of the replacement housing to a bottom of the accessory device. In some embodiments, the accessory device may connect to the bottom arm with a rotatable connector and the top arm with an arced opening that allows adjustment in the rotation. In other embodiments, the top and bottom arms form a rigid or semi-rigid connection to hold the accessory device in place. The connectors may include gaskets or protective layers to limit or absorb impacts caused by the system operation and the vibration of the vehicle.

Some embodiments may include covers to limit or prevent dirt, sand and other debris from getting on the drive system pulley, accessory pulley or drive belt. The cover may be attached to a replacement housing of the alternator, the housing of an accessory device or arms configured to hold the accessory. In some embodiments, the replacement housing may include a protective wall configured to fit between the drive pulley and cover. This wall may provide a redundant layer with the cover to reduce the likelihood that debris gets between the cover and replacement housing to interfere with the drive pulley. A cover may include an access opening to allow a user to adjust components or clean out any debris that did get into the drive system.

Some embodiments may include an enclosure system to fully enclose the drive pulley, accessory pulley and drive belt. In some embodiments, the enclosure may have a two-part clamshell design having a back section and a front section. In some embodiments, the back section may attach between the replacement housing on one side and the pulleys and drive belt on the opposite side. The front section of the enclosure may then attach to the back section and enclose the pulleys and drive belt. In some embodiments, the front section may include an air intake. In some embodiments, the air intake may be connected via a hose or duct to a clean air source.

In some embodiments, the drive pulley may include a series of fins or blades on the front surface around the outer area. When the pulley rotates around the axis, the blades create airflow. In some embodiments, the pulley with fins is used within an enclosure. In such embodiments, the airflow created by the pulley's rotation may reduce the temperature within the enclosure. In some embodiments, an air intake in the structure of the enclosure may be configured to allow the fins to pull air from a clean air source and move warm air away from the enclosure.

Some embodiments create a multiple accessory system with a replacement rotary drum configured to replace an existing rotary component and attach to an existing rotary drive. The rotary drum may include a central hub having a stem opening to fit over the existing rotary drive and exterior connections, such as threading. The threading may be left-hand threaded. The rotary drum may be attached to the rotary drive using an existing bolt of the rotary driven component.

Some embodiments include a drive shaft having a cap and connection flange on a first end section. The connection flange attaches to the exterior connections of the central hub. For example, the connection flange and the central hub may form a left-hand threaded connection. The cap forms a cover over the head of the bolt at the top of the central hub.

The drive shaft may have a middle section extending from the cap. The middle section may pass through a drive shaft support and the opening of a housing in which the drive shaft support is attached.

The second end section may include a connection portion with a conical section into a locking section. The conical section may have a shaft channel designed to hold a key for connecting with a drive wheel. The locking section may be configured to hold the drive wheel laterally onto the drive shaft.

The drive wheel may have a wheel opening configured to fit the key and conical section. As the drive shaft turns, the key engages the sides of the wheel opening and the shaft channel to cause the drive wheel to turn.

In some embodiments, the drive wheel is a drive pulley with two pulley channels. Each pulley channel may engage a different drive belt. The first drive belt may connect to a first accessory rotary component and the second drive belt may connect to a second accessory rotary component. For example, the first drive belt may connect to a compressor and the second drive belt may connect to an alternator. During operation, the rotation of the drive pulley drives both the compressor and the alternator using the two belts.

In some embodiments, the system includes a tensioner for one or both belts. The tensioners may be spring tensioners in some embodiments. The tensioners may apply pressure to the belts to maintain engagement of the belts to the pulleys.

In some embodiments, the pulleys, tensioners and belts may be within an enclosure. The enclosure may be formed from a clamshell housing having an enclosure base and an enclosure cover.

A BRIEF DESCRIPTION OF THE DRAWINGS

Embodiments will now be described, by way of example only, with references to the accompanying drawings in which:

FIG. 18 is an assembled view of an embodiment of the assembly using the drive mechanism and the enclosure;

FIG. 19 is a cross-sectional view of an embodiment of the assembly using the drive mechanism and the first portion of the enclosure;

FIG. 20 is an enlarged, cross-sectional view of an embodiment of the drive mechanism; and FIG. 21 is a perspective view of an embodiment of the assembly using the drive mechanism and the first portion of the enclosure.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein.

Figure 1:
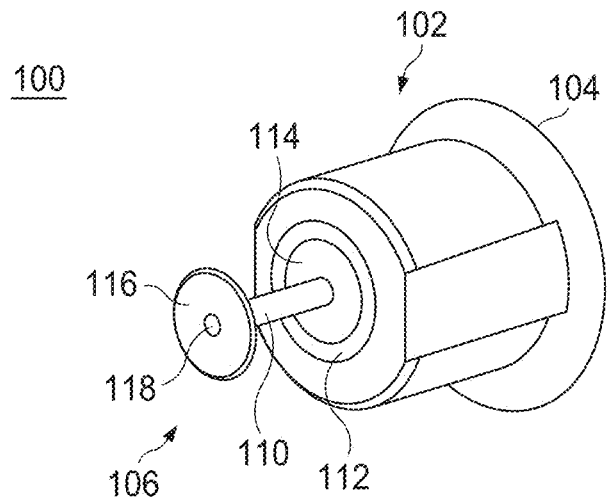
FIG. 1 is a perspective view of an embodiment of an alternator having the drive mechanism.

FIG. 1 depicts a rotary drive assembly. In this embodiment, the rotary drive device 100 is shown as an alternator 102 with a drive mechanism 106. The drive mechanism 106 may be configured to attach to components other than the alternator 102 in some embodiments. The alternator 102 includes mounting flange 104 for mounting the alternator 102 to an engine or other components that provide the rotational output. The drive mechanism 106 includes the drive shaft 110, which extends into the body of alternator 102. The drive shaft 110 passes through the drive shaft housing 112 and seal 114, which is located in an opening of alternator 102. The drive shaft housing 112 and seal 114 are designed to support the drive shaft 110.

A drive pulley 116 is secured to a second end of the drive shaft 110, away from the alternator 102, by a connector shown as bolt 118. In some embodiments, the drive pulley 116 may be replaced by other drive wheel components to transfer rotary force, such as a gear, and may connect to driven rotary components by a gear system, chain, belt or other link. In addition, the connector may be any type of attachment component, such as a screw, locking pin, nut, snap-fit, or other connector. In some embodiments, the drive pulley 116 may be permanently or semi-permanently attached. For example, the drive pulley 116 may be welded or adhered to the drive shaft 110.

Figure 2:
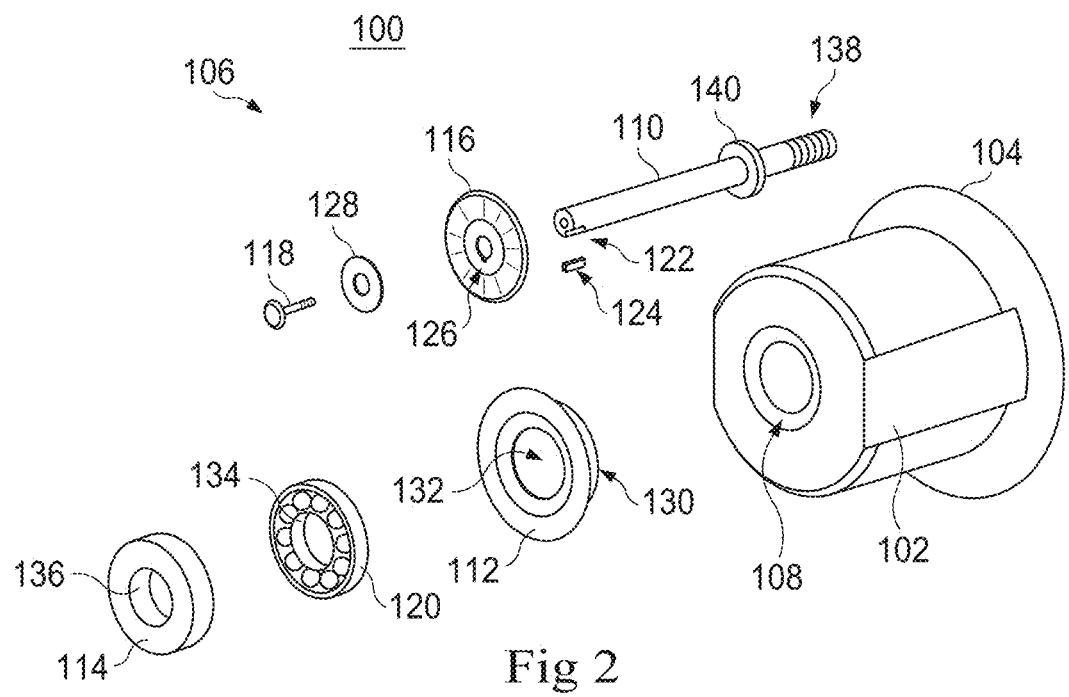
FIG. 2 is an exploded view of an embodiment of the alternator with the drive mechanism.

FIG. 2 shows an exploded view of the rotary drive device 100. The alternator 102 is shown with adjusting hole 108. The adjusting hole 108 may typically be covered by a cap that seals the hole when drive mechanism 106 is not installed. When the drive mechanism 106 is installed as an aftermarket conversion, the cap may be removed from adjusting hole 108.

The drive shaft housing 112 has a connection section 130 configured to attach to the adjusting hole 108. The connection section 130 may be threaded or include snaps or other connectors designed to hold the housing 112 in place. On the opposite side, the housing 112 has housing opening 132, which holds rotary bearing 120 and engages seal 114. The seal 114 connects with housing 112 within opening 132 and holds the rotary bearing 120 in place. The interior side of the rotary bearing 120 abuts the drive shaft 110 and rotates with the drive shaft 110 during operation.

In this embodiment, the drive shaft 110 includes a threaded first end 138 with a flange 140 configured to fit into the alternator 102's housing with the extended shaft extending through the adjusting hole 108 in alternator 102. As the drive shaft 110 extends through the adjusting hole 108, it also passes through the housing opening 132, rotary bearing opening 134 and seal opening 136.

The assembly of the drive pulley 116 connection to the drive shaft 110 is also shown. In this embodiment, the assembly includes a bolt 118, which passes through a washer 128 and drive pulley 116. The bolt 118 is configured to attach to the drive shaft 110 and hold the drive pulley 116 in place.

The drive pulley 116 has an opening with an extended channel 126 in one section that corresponds to a shaft channel 122 in the drive shaft 110. Key 124 fits in both the shaft channel 122 and extended channel 126. When assembled, the key 124 operates to engage the drive pulley 116 with the drive shaft 110, so that the drive pulley 116 rotates with the drive shaft 110. In some embodiments, the key 124 may be integrated into the drive shaft 110, the drive pulley 116 or the washer 128. Alternatively, the second end of the drive shaft 110 may be designed with an alternative shape that causes the drive pulley 116 to rotate with the drive shaft 110. For example, the second end of drive shaft 110 may be a polygon—such as a triangle, square, rectangle, hexagon, etc.—with sufficient angles to engage a corresponding opening in the drive pulley 116.

Figure 3:
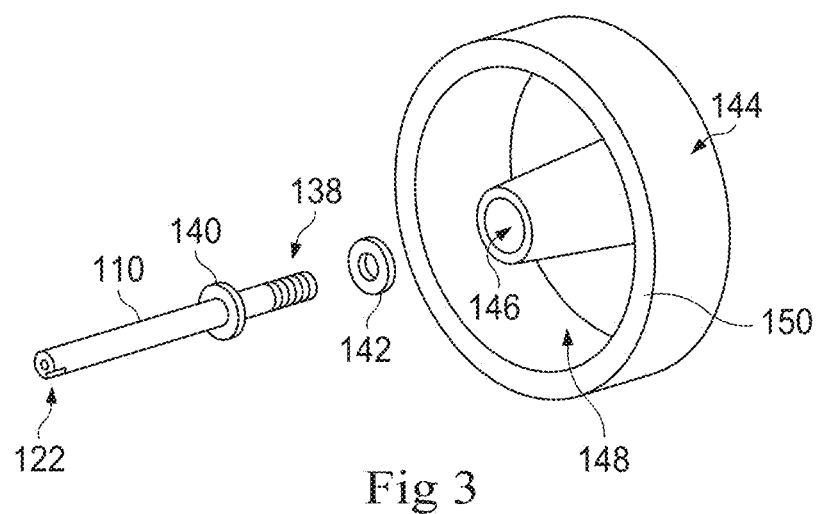
FIG. 3 is an exploded view of an embodiment of an alternator flywheel and a drive shaft of the drive mechanism.

FIG. 3 shows some components internal to the alternator 102, including a flywheel 144, washer 142 and drive shaft 110, which is partially housed within the alternator 102. In embodiments without the drive mechanism 106, a bolt or other connector may be used to mount the flywheel 144. During a conversion or installation, the bolt may be removed and replaced with the drive shaft 110.

The design of drive shaft 110 may be configured to replace specific connectors in a rotary system by using the same connection or an alternative connection. For example, a rotary system using a snap-fit connection may be replaced with a drive shaft 110 having a screw connection designed to thread into the snap fit. One having ordinary skill in the art will recognize that the size, shape and design of the drive shaft connection at the first end may vary to correspond to existing rotary drive components or to fit a new rotary drive design.

The flywheel 144 has a center opening 146, through which a bolt or the drive shaft 110 passes to engage a rotary drive, such as that of an engine. The flywheel 144 includes a stator channel 148 between the center opening 146 and an outer wall 150, which holds a set of magnets. As those skilled in the art will understand, during operation of the alternator 102, the flywheel 144 rotates around a stator (not shown) to generate electrical energy to operate vehicle components. Because the alternator 102 generates electricity for vehicle systems, the alternator 102 may be connected to a rotary drive that does not stop while the vehicle idles so that power will continue to be generated while the vehicle runs, even if it is stopped or parked.

While this embodiment shows the flywheel 144 facing toward the adjusting hole 108, some alternator embodiments may face inward with the stator between the flywheel 144 and the engine's rotary drive. In such embodiments, the drive shaft 110 may be configured for any changes in the connection design between the rotary drive and the flywheel 144. For example, the design may require a longer threaded first end bolt section 138 or a different placement along the shaft for flange 140.

The drive mechanism 106 may need to be installed when an accessory component, such as an air conditioning compressor, is being installed to provide power to the accessory. Installing the drive mechanism 106 in a vehicle with an existing rotary system, such as an alternator 102, may include multiple steps. First, the installer must have access for installation. In some embodiments, removing a cap from the adjusting hole 108 may provide sufficient access for replacing a bolt holding the flywheel 144 in place with the drive shaft 110. In other embodiments, the housing of the alternator 102 may be removed to allow sufficient access.

The installer will then remove the existing connector, e.g., bolt, holding the flywheel 144 and replace it with drive shaft 110. In some embodiments, the drive shaft 110's threaded first end 138 will be threaded into the rotary drive for the flywheel 144. The depth of the threaded first end 138 to the flange 140 may be designed so that tightening the drive shaft will cause the flange 140 to press against the washer 142 and the end of the center opening 146 to hold the flywheel 144 in place. The washer 142 may not be needed in addition to the flange 140. In some embodiments, one or more washers 142 may be used to make one configuration and length of a drive shaft 110 fit different depth designs.

Once the drive shaft 110 is in place, the installer may reattach the housing 112 of alternator 102, if it was removed, such that the drive shaft 110 extends through the adjusting hole 108. Then, the housing 112 is installed over the drive shaft 110 and connected into the adjusting hole 108. Next, the rotary bearing 120 and seal 114 are installed over the drive shaft 110. The seal 114 is connected to the housing 112 with the rotary bearing 120 in place. In some embodiments, the housing 112, rotary bearing 120 and seal 114 are installed as a single support structure assembly over the drive shaft 110 and in the adjusting hole 108.

Next, the installer attaches the drive pulley 116. For example, the installer places the key 124 in the shaft channel 122 and slides the drive pulley 116 over the second end of the drive shaft 110 and key 124 with the extended channel 126 of the drive pulley 116 aligned with the key 124. In some embodiments, the key 124 widens toward the bottom, which creates a natural stop for the drive pulley 116. In other embodiments, the drive shaft 110 may include a stop, such as a flange or bracket that acts to prevent the drive pulley 116 from sliding further down the drive shaft 110. The bolt 118 is placed through the washer 128 and the drive pulley 116 to engage the second end of the drive shaft 110. The bolt 118 is tightened to hold the drive pulley 116 securely in place.

In some embodiments, the second end of drive shaft 110 may be shaped as a polygon corresponding to the opening of the drive pulley 116. In addition, the polygon may match the size and shape of the head of the bolt that is removed from the flywheel 144. Such a design may allow an installer to use the same tool to remove the bolt and install the drive shaft 110. Bolt 118 may also use the same size bolt head. If consistent size and shape features are used, an installer may use a single tool for replacing the bolt with a drive shaft 110 and drive pulley 116. This may increase efficiency and reduce complexity in the conversion process.

Once the drive pulley 116 is securely in place, the installer may install the corresponding accessory and mechanically link the drive pulley 116 with the accessory's pulley using a chain, belt or other link.

Figure 4:
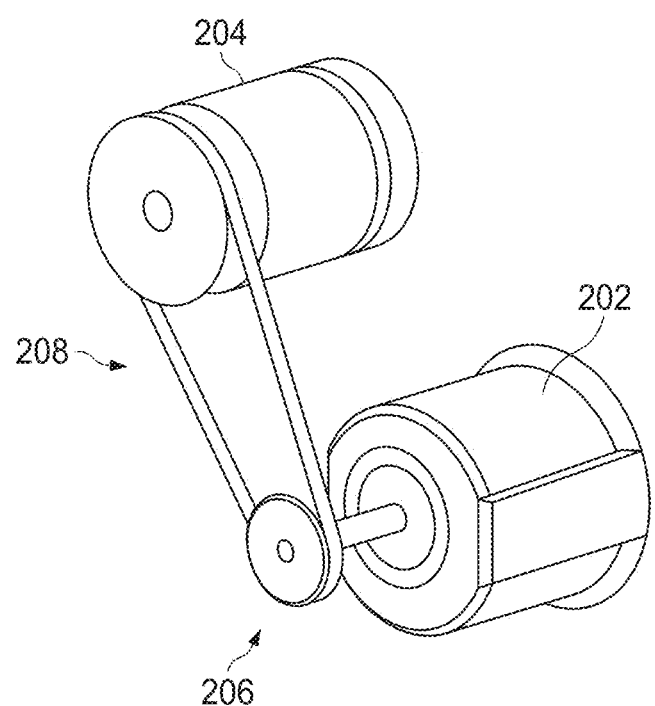
FIG. 4 is a perspective view of an assembly using the drive mechanism.

FIG. 4 illustrates an example system using an alternator 202 to run an air conditioning compressor 204. Those skilled in the art will recognize that the alternator 202 and compressor 204 may be replaced by alternative components that have a rotary drive or use a rotary drive for operation. The alternator 202 includes a drive mechanism 206 having a belt drive pulley. A belt 208 connects the belt drive pulley to the rotary drive for the compressor 204. In some embodiments, other links may be used in place of the belt 208. In addition, some systems may use alternative drive mechanism connections, such as gears or other drive wheels, which would transfer the power from the drive shaft to another component.

In some embodiments, the system may include more components that utilize the belt drive. For example, the system may include a water pump and a condenser 204 driven by belt 208 and the drive mechanism 206. In some embodiments, the system may include a tensioner to apply proper tension for the belt's operation to transfer rotary power to the condenser 204.

Figure 5:
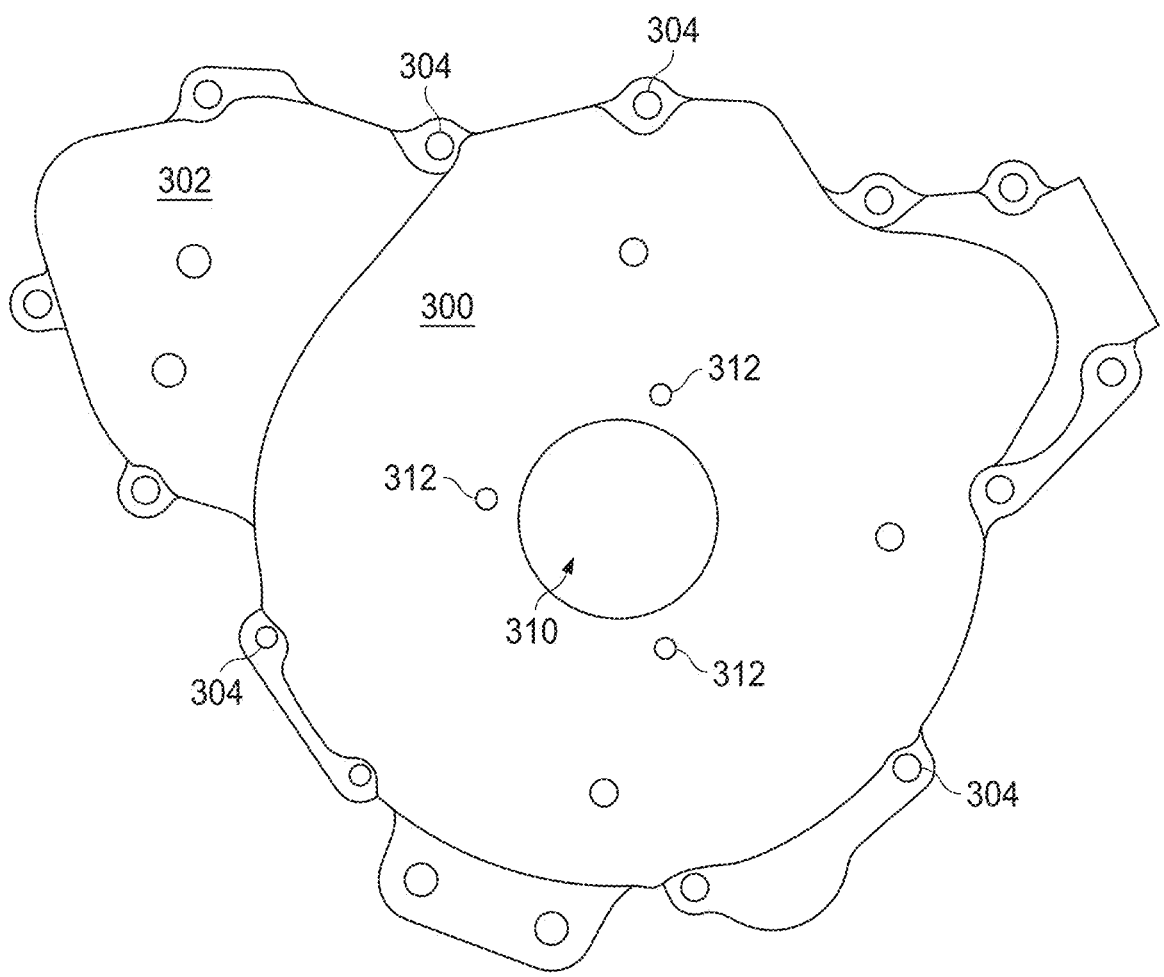
FIG. 5 is a view of a replacement housing.

FIG. 5 depicts a replacement housing 300 for covering an alternator having a stator and rotatable flywheel. Multiple designs of replacement housing 300 may be available, with each one configured to fit specific engine and associated alternator designs. The replacement housing 300 includes an accessory mount 302 to which an accessory—such as an air conditioning compressor, electric alternator or hydraulic system drive—may be mounted or otherwise secured for operation. In addition, the replacement housing 300 includes mounts 304 around the replacement housing 300 for attaching the replacement housing 300 to an engine, secondary alternator housing or other component. The mounts 304 are similar to the mounting flange 104 described in FIG. 1.

The replacement housing 300 also includes an access hole 310, which is an opening aligned with the axis of the internal rotating flywheel or other component. Three drive mechanism mounts 312 are located around the access hole 310. Embodiments of the replacement housing 300 may include a different number of drive mechanism mounts 312. In some embodiments, the drive mechanism mounts 312 may be threaded openings to accept a bolt or other connector. In other embodiments, the drive mechanism mounts 312 may be holes designed to accept a screw, clip or other connector. In some embodiments, the drive mechanism mounts 312 may include a protrusion or indention. The protrusion or indention may fit a corresponding protrusion, indentation or hole in the drive mechanism to assist in aligning components and strengthening the connection. The access hole 310 and drive mechanism mounts 312 accept the drive mechanism and connectors to hold the drive mechanism in place.

The replacement housing 300 may be used when the existing housing does not include an access hole, such as the adjusting hole discussed in connection with other embodiments. Under some circumstances, the replacement housing 300 may be used because it provides a simpler attachment for the drive mechanism 400 (shown in FIG. 6) and includes mounting options for accessory devices, such as an air conditioning compressor, an electric alternator or a hydraulic drive component. In some embodiments, the replacement housing 300 may be configured to include mounting options for multiple accessory devices.

Figure 6:
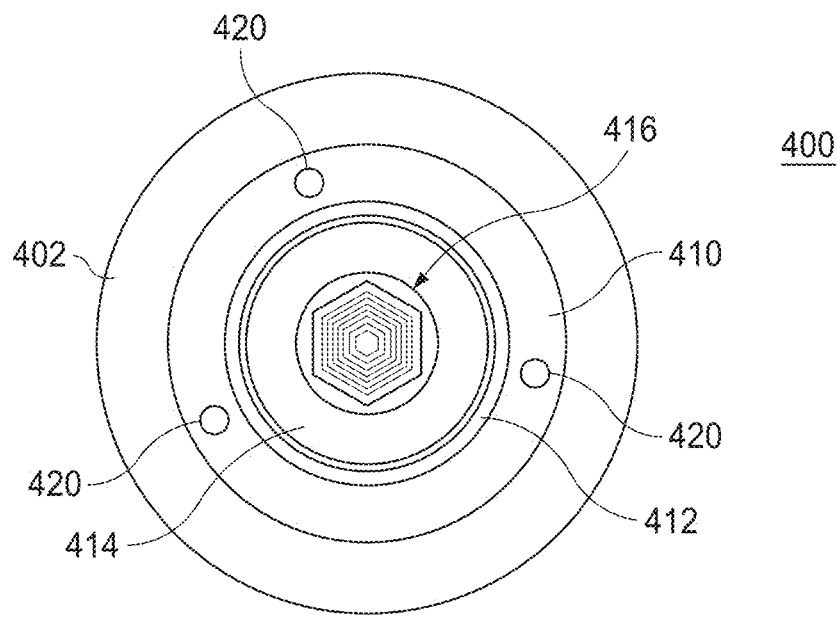
FIG. 6 is a back view of an embodiment of a drive mechanism.
Figure 7:
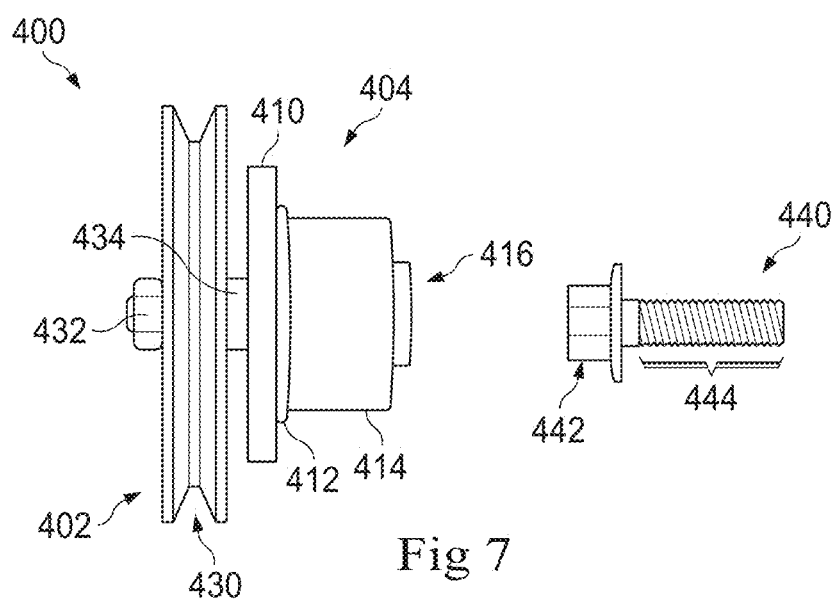
FIG. 7 is a side view of an embodiment of a drive mechanism and bolt for a flywheel.

FIG. 6 shows the drive mechanism 400 from the back, which is the side directed into the replacement housing 300 or an existing housing for an alternator or other rotational component. FIG. 7 shows a side view of the drive mechanism 400 along with a bolt 440.

In these embodiments, the drive mechanism 400 includes a drive pulley 402, a drive shaft housing 404 and a drive shaft 434 that connects to the drive pulley 402. The drive shaft housing 404 includes a mounting rim 410 attached to or integrated with body 414. The mounting rim 410 is on the front side of the body 414 closest to the pulley 402.

The drive shaft housing 404 may be configured to fit with the access hole 310 in the replacement housing 300. In the embodiments shown, the access hole 310 is circular and the body 414 is cylindrical with a circular cross-section, wherein the body 414 may pass through the access hole 310 up to the mounting rim 410. The access hole 310 and cross-sectional shape of body 414 may be other shapes, such as ellipses, polygons, stars, etc.

The mounting rim 410 includes three mounts 420 corresponding to the drive mechanism mounts 312 in the replacement housing 300. In some embodiments, the number of mounts 420 will vary. In some embodiments, the number or drive mechanism mounts 312 in the replacement housing 300 and the number of mounts 420 on the drive mechanism 400 may be configured to match.

In some embodiments, the mounts 420 may be threaded openings to accept a bolt or other connector. In other embodiments, the mounts 420 may be holes designed to accept a screw, clip or other connector. In some embodiments, the mounts 420 may include a combination of protrusions or indentions. The protrusions or indentions may fit corresponding protrusions, indentations or holes in the replacement housing 300 to assist in aligning components and strengthening the connection. As an example, mounts 420 may be holes through which bolts may pass and thread into the drive mechanism mounts 312.

A sealing ring 412 is shown around the body 414 adjacent to the mounting rim 410. The sealing ring 412 helps create a seal between the body 414 and the replacement housing 300. In some embodiments, the sealing ring 412 may be replaced with alternative seals.

The body 414 contains a rotary bearing around an internal portion of the drive shaft 434, which extends through the drive pulley 402. In some embodiments, the rotary bearing may be a ball bearing, cylinder bearing or any other bearing that allows the drive shaft 434 to rotate.

In addition, the body 414 may contain an internal seal. The internal seal may prevent or limit fluids from exiting or entering the replacement housing 300 through the body 414.

In some embodiments, the internal seal and the sealing ring 412 may collectively create a fluid tight or resistant seal for the access hole 310.

The drive mechanism 400 also includes a socket 416 at an end of the drive shaft 434 opposite from the drive pulley 402. The socket 416 may be built into or attached to the drive shaft 434. The socket 416 may be configured to correspond to a bolt 440 that rotates. The bolt 440 may be a replacement connector or the existing connector, which attaches the flywheel to a rotating component of the engine. The bolt 440 includes the head 442 and the threaded section 444.

When the drive mechanism 400 is mounted in place, the socket 416 is configured to fit over the head 442 of the bolt 440. In some embodiments, the socket 416 may be configured to fit a variety of sizes for head 442. For example, the socket 416 may include staggered tiers that correlate to common sizes of heads 442. In this embodiment, the socket 416 and head 442 are in the shape of a hexagon. Other embodiments may include alternative shapes that allow the socket 416 to engage the head 442.

The drive pulley 402 includes a channel 430 in which a belt or other component fits. The belt or other component is used to connect to other pulley components to transfer rotary force. For example, a belt may connect the drive pulley 402 to a pulley for an air conditioning compressor, hydraulic controller or an alternator. In some embodiments, the channel 430 may include teeth or protrusions configured to engage notches in the belt, chain or other component.

In this embodiment, the drive pulley 402 is attached to drive shaft 434 by connector 432. In some embodiments, the drive shaft 434 includes a notch or groove that matches a complimentary groove or notch in the center of the drive pulley 402. When the connector 432, such as a nut, is tightened, it holds the drive pulley 402 in connection with the drive shaft 434.

During operation of a vehicle, the bolt 440 rotates, causing the drive shaft 434 to rotate because of the connection between the head 442 and the socket 416. The drive shaft 434 rotates within the body 414 with limited resistance due to the rotary bearings. As the drive shaft 434 rotates, the drive pulley 402 also rotates.

Figure 8:
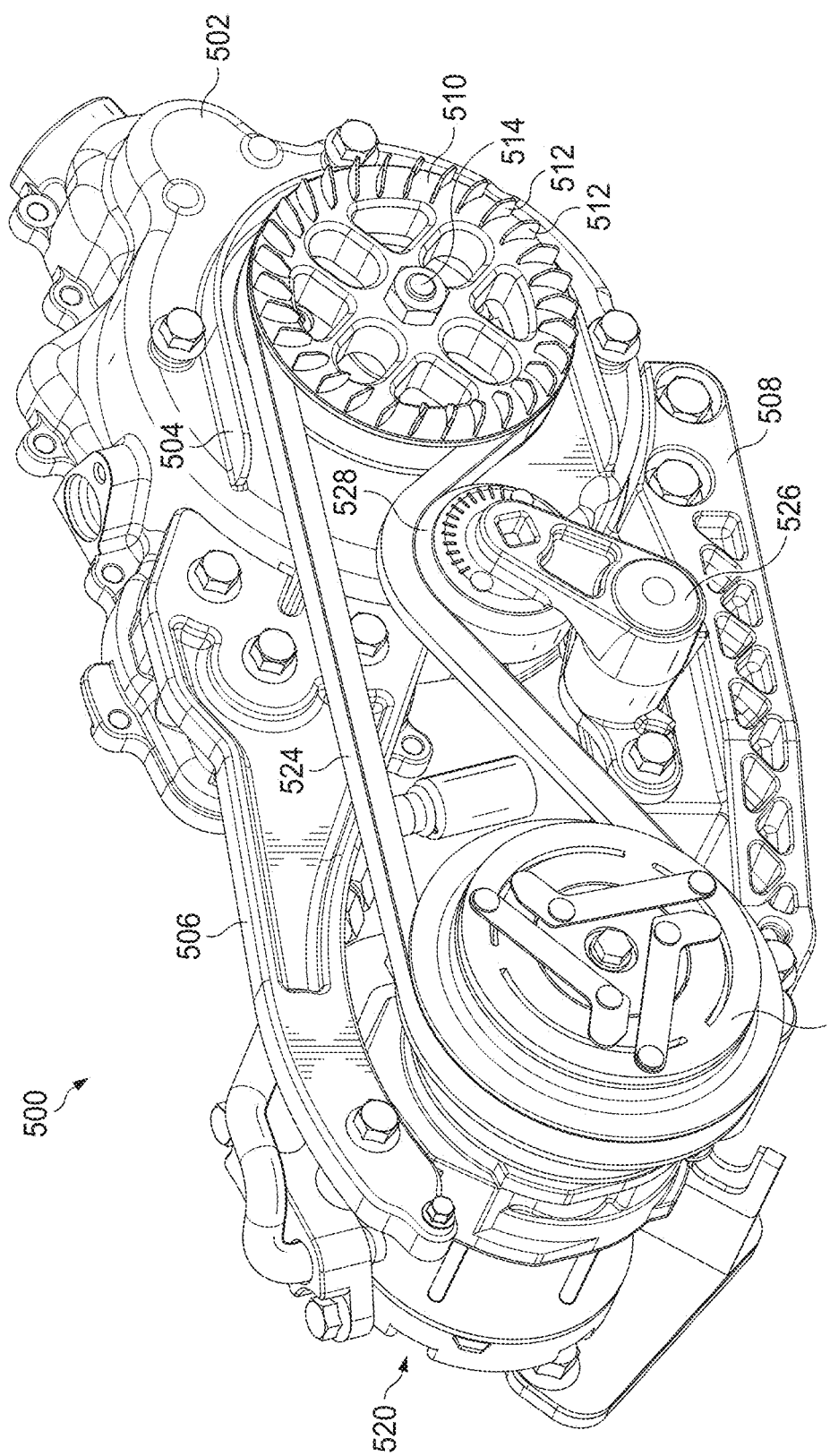
FIG. 8 is a perspective view of another embodiment of an assembly using the drive mechanism.

FIG. 8 depicts a rotary drive assembly 500. The rotary drive assembly includes a rotary drive device, such as an alternator, with a drive mechanism connected to an accessory, shown as a compressor 520. For purposes of discussion, the rotary device will be discussed as an alternator. Those skilled in the art will recognize that the rotary device may be any component with a rotating component or output.

This embodiment includes a replacement alternator housing 502, which covers the alternator components. The drive mechanism includes a drive shaft 514, which extends through the alternator housing 502 into the body of an alternator and connects to the rotary output. A drive pulley 510 is secured to a second end of the drive shaft 514, away from the alternator. In some embodiments, the drive pulley 510 may be replaced by other drive wheel components to transfer rotary force, such as a gear, and may connect to driven rotary components by a gear system, chain, belt or other link.

In this embodiment, the drive pulley 510 includes blades 512 configured to create airflow based on rotation of the drive pulley 510. The airflow created by the blades 512 may help direct debris away from the rotary drive assembly 500.

In this embodiment, the rotary drive assembly 500 includes a top arm 506 and a bottom arm 508, which connect the replacement housing 502 to the compressor 520. The top arm 506 attaches to the replacement housing 502 using three connectors, which are shown as bolts. The bottom arm 508 is attached to the replacement housing 502 with two connectors. In other embodiments, the number and types of connectors may vary for both the top arm 506 and bottom arm 508.

In some embodiments, the connectors may be designed to hold the arms 506 and 508 to the replacement housing 502. In other embodiments, replacement housing 502 includes protruding sections around the connectors, and the arms 506 and 508 include corresponding indentions designed to fit over the protruding sections. In such embodiments, the corresponding protrusions and indentions may form the core connection to prevent movement of the arms 506 and 508 relative to the replacement housing 502, while the connectors hold the arms 506 and 508 to the replacement housing 502 in the axial direction of the connectors. This design will reduce pressures on the connectors and limit the likelihood of a connector shearing.

In this embodiment, the compressor 520 attaches to a second end of the top arm 506 and a second end of the bottom arm 508. The top connection is shown with a bolt in a fixed position. In some embodiments, the top arm 506 may include an oblong opening, which allows the connection position with the top arm 506 to be adjustable. The bottom arm 508 may connect to the bottom of the compressor 520 with a fixed or rotatable connection. For example, a rotatable connection may be a bolt passing through a tube section on the bottom arm 508 and eyeholes on the compressor 520 fitting over both ends of the tube. Those skilled in the art will recognize that a fixed connection on the top arm 506 effectively prevents the rotation of a rotatable connection with the bottom arm 508. In some embodiments, the connections may include coatings, gaskets, liners or other features to protect components from impact or vibration at the connections.

The rotary drive assembly 500 includes a drive belt 524 to transfer power from the drive pulley 510 to the compressor pulley 522. Other embodiments may use other linking components, such as chains, gears or other links. In this embodiment, the rotary drive assembly 500 also includes a tensioner 526 having a tension pulley 528 that rotates freely with the movement of the drive belt 524.

The tensioner 526 is shown as a self-adjusting tensioner, such as a spring loaded tensioner. The tensioner 526 may be attached to the bottom arm 508 by a bracket. The tensioner 526 may provide a rotatable tension, wherein the tension pulley 528 rotates around the base of the tensioner 526. The tensioner 526 may maintain tension on the drive belt 524 during operation, even if the drive belt 524 stretches or gives over time. In other embodiments, the tensioner 526 may be a manually adjusted tensioner that requires a user to change the tension on the drive belt 524.

In this embodiment, the replacement housing 502 also includes a protective ridge 504 around the drive pulley 510. The protective ridge 504 may help prevent dirt, sand and other debris from entering the drive pulley 510. The protective ridge 504 may work in tandem with a cover or enclosure that fits over the protective ridge 504 to further protect the rotary drive assembly 500 and prevent debris from entering the assembly.

FIGS. 9 through 12 show views of an embodiment of the rotary drive assembly 500 including an enclosure 530. In this embodiment, the enclosure 530 is shown as a two-part clamshell housing with a front section 532 and a back section 534. The front section 532 includes an air intake port 536, which allows airflow into and out of the enclosure 530.

In some embodiments, the air intake port 536 connects to an air hose or duct that provides access to a clean air source, such as a filtered air source or an ambient air source away from dirt and debris.

Figure 9:
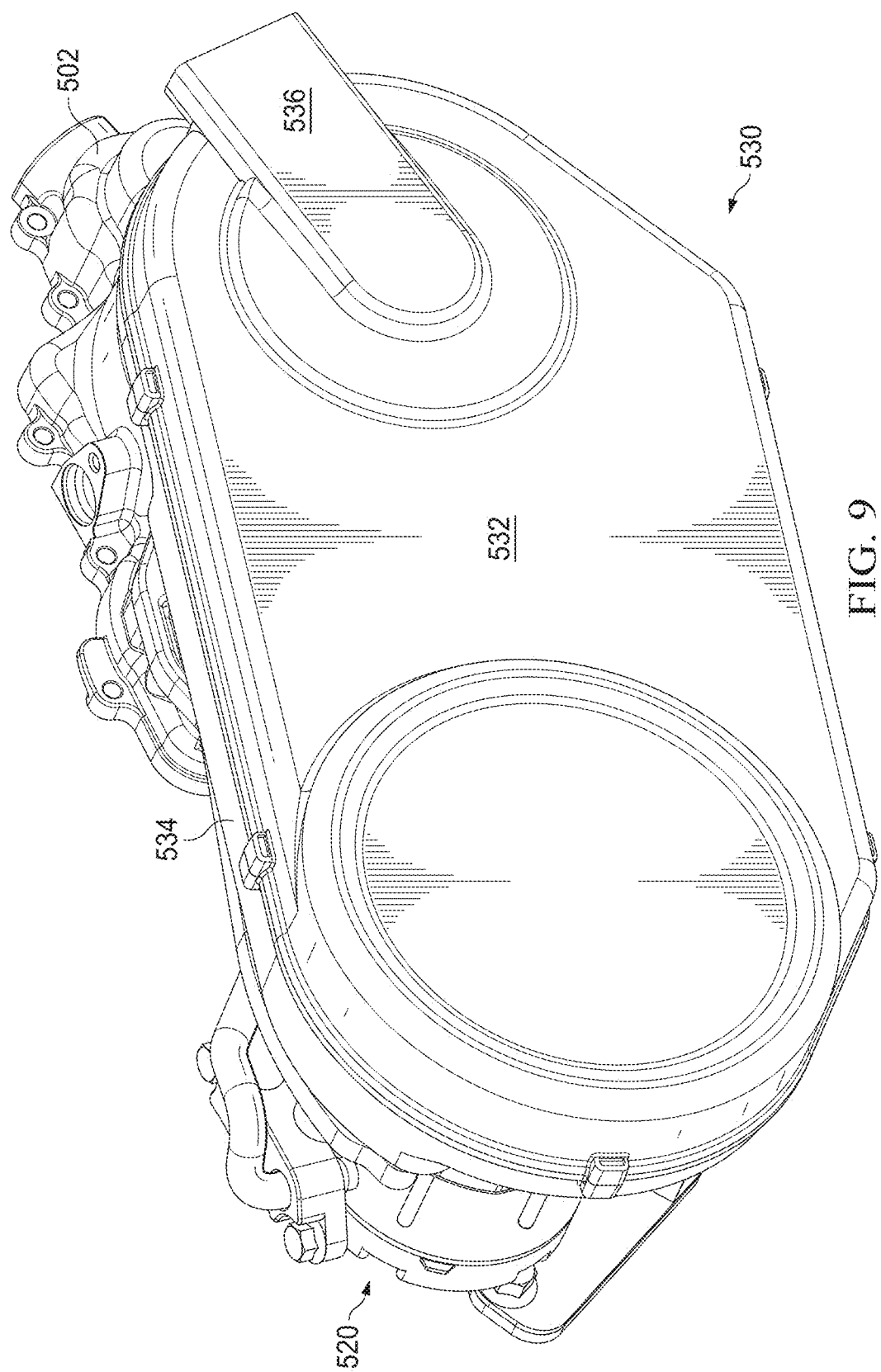
FIG. 9 is a perspective view of an embodiment of an assembly using the drive mechanism and an enclosure.
Figure 10:
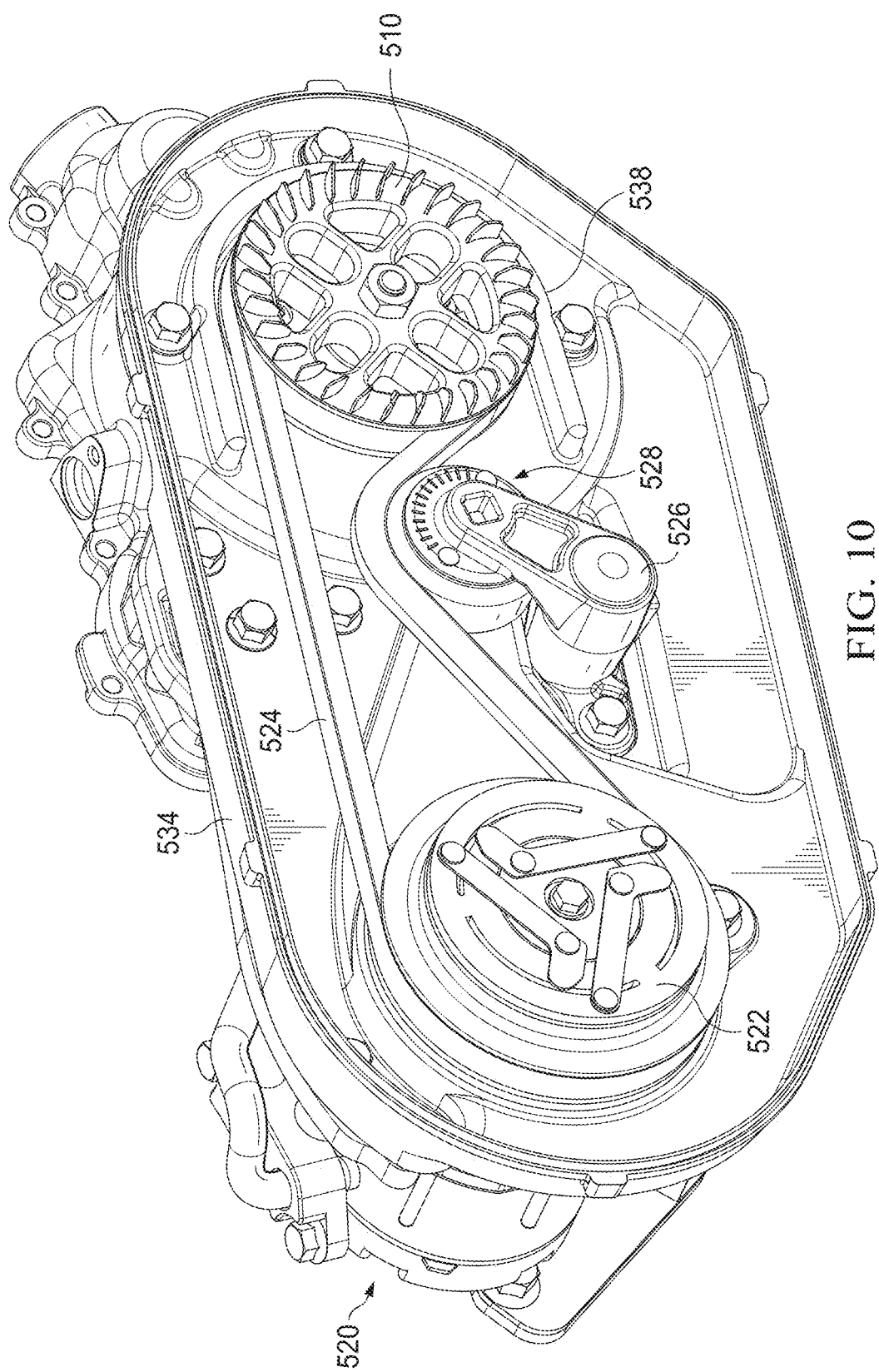
FIG. 10 is a perspective view of another embodiment of an assembly using the drive mechanism with an enclosure front removed.

The rotary drive assembly 500 is shown with the front section 532 removed in FIG. 10. In this embodiment, drive pulley 510, tensioner 526, compressor pulley 522 and drive belt 524 are all held within the enclosure 530 (shown in FIG. 9). In this embodiment, the drive pulley 510 includes blades 512. As the drive pulley 510 rotates, the blades 512 create an airflow within the enclosure 530. In some embodiments, the airflow pulls in air from the air intake port 536 creating a higher pressure within the enclosure 530, causing air to escape any openings or gaps in the enclosure 530 and preventing debris from entering the enclosure 530.

In this embodiment, the tensioner 526 includes the tension pulley 528 that is spring adjusted to maintain tension on the drive belt 524. Incorporating a self-adjusting tensioner within the enclosure 530 reduces the likelihood that the drive belt 524 will need to be tightened during operation of the vehicle and the likelihood that front section 532 of the enclosure 530 will need to be removed for maintenance.

The back section 534 attaches to the replacement cover 502, the top arm 506, and the bottom arm 508 at multiple points that extend from the compressor 520 to the replacement cover 502. The connections for the back section 534 may be the same as the connections for the arms 506 and 508. For example, bolts connecting the arms 506 and 508 to the replacement cover 502 and compressor 520 may pass through the back section 534 first to hold the back section 534 in place.

In some embodiments, the back section 534 may include a channel 538 configured to fit over a corresponding protective ridge 504. The protective ridge 504 and channel 538 may prevent dust, sand or other debris from reaching the drive shaft 514. Some embodiments may not include the protective ridge 504 and channel 538. The back section 534 may also include one or more additional formed sections to fit over components or parts thereof, including the replacement cover 502, the compressor 520, the arms 506 and 508, or other components.

Figure 11:
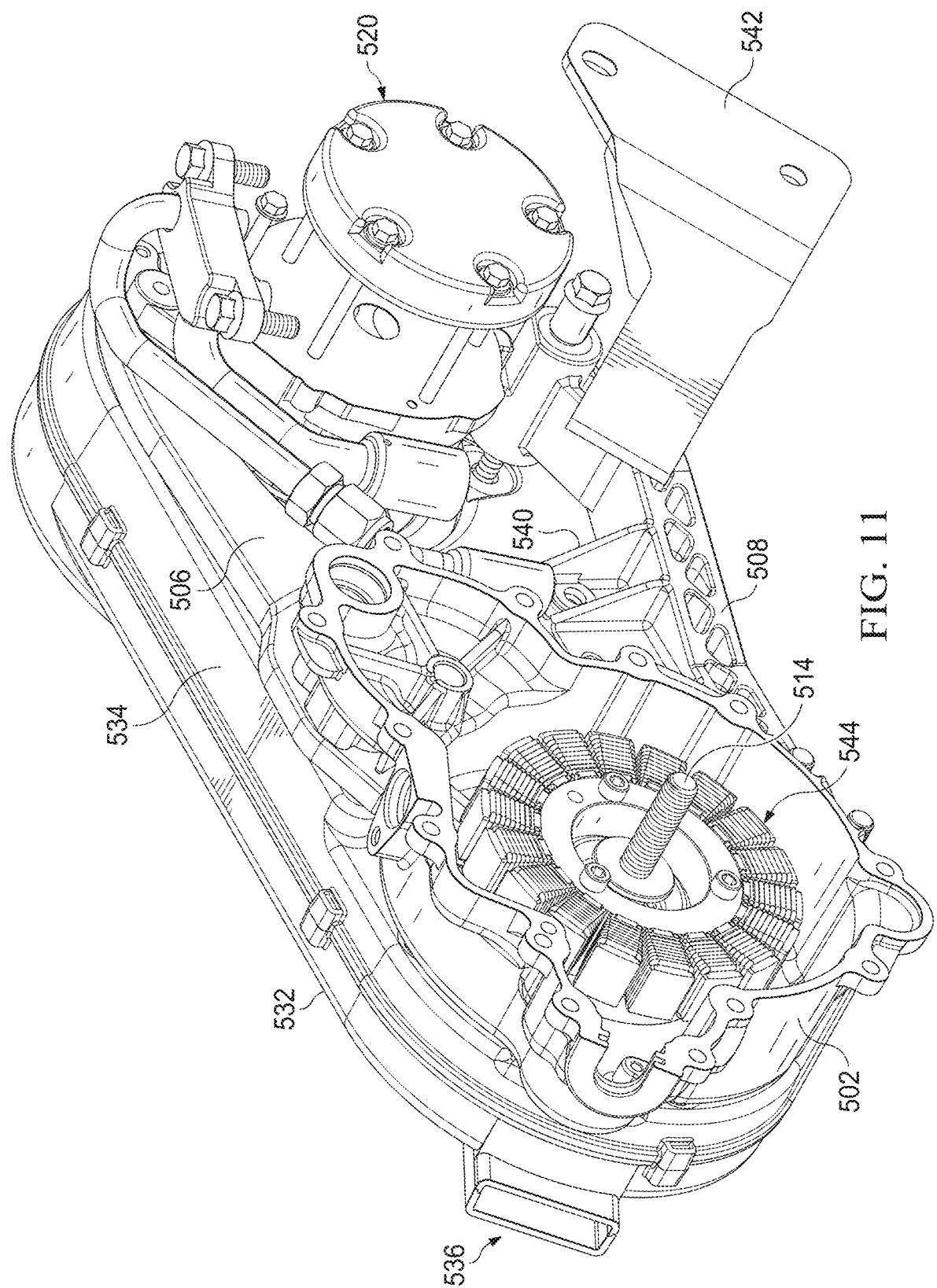
FIG. 11 is a back, perspective view of an embodiment of an assembly using the drive mechanism and an enclosure.

FIG. 11 illustrates a back view of the rotary drive system 500 with the enclosure 530 (see FIG. 9). This view illustrates the bolt section of the drive shaft 514, which passes through the stator 544. As discussed with other embodiments, the bolt section of the drive shaft 514 may connect a flywheel to a rotary component. The flywheel rotates around the stator 544 to generate electrical energy to operate vehicle components. The drive shaft 514, in connection with the rotary component, causes both the flywheel and the drive pulley 510 to rotate.

This view also shows a tensioner bracket 540 on the bottom arm 508. In this embodiment, the tensioner bracket 540 is formed with the bottom arm 508. In some embodiments, the tensioner bracket 540 may be connected to the bottom arm 508 using another connection, such as welding, bolts, screws, or other connectors. The tensioner 526 connects to the tensioner bracket 540 through the back section 534 of the enclosure 530.

This embodiment also includes a frame bracket 542. The frame bracket 542 may connect to the vehicle structure and provide support for the compressor 520. In some embodiments, the frame bracket 542 may directly support the compressor 520. In other embodiments, the frame bracket 542 may support the top arm 506 or bottom arm 508 to provide support for the compressor 520.

Figure 12:
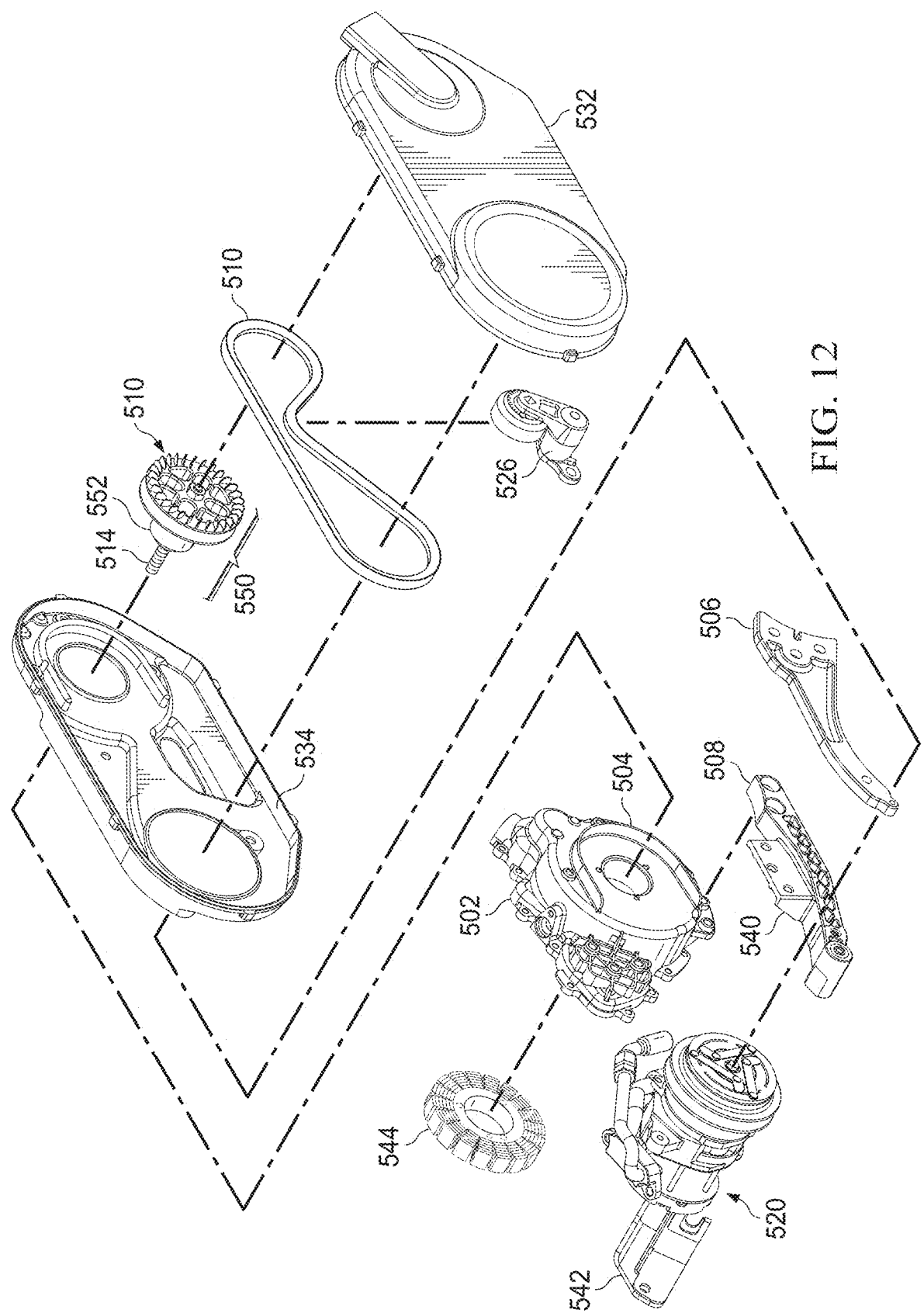
FIG. 12 is an exploded view of an embodiment of an assembly using the drive mechanism and an enclosure.

The exploded view in FIG. 12 shows the relationship between the components. As illustrated, the rotary drive system 500 includes a drive mechanism 550 having the drive shaft 514, drive shaft housing 552 and drive pulley 510. The drive shaft housing 552 attaches to the alternator housing 502 and holds the drive pulley 510 within the enclosure 530, and the drive shaft 514 extends through the stator 544 and attaches to a rotary component.

Figure 13:
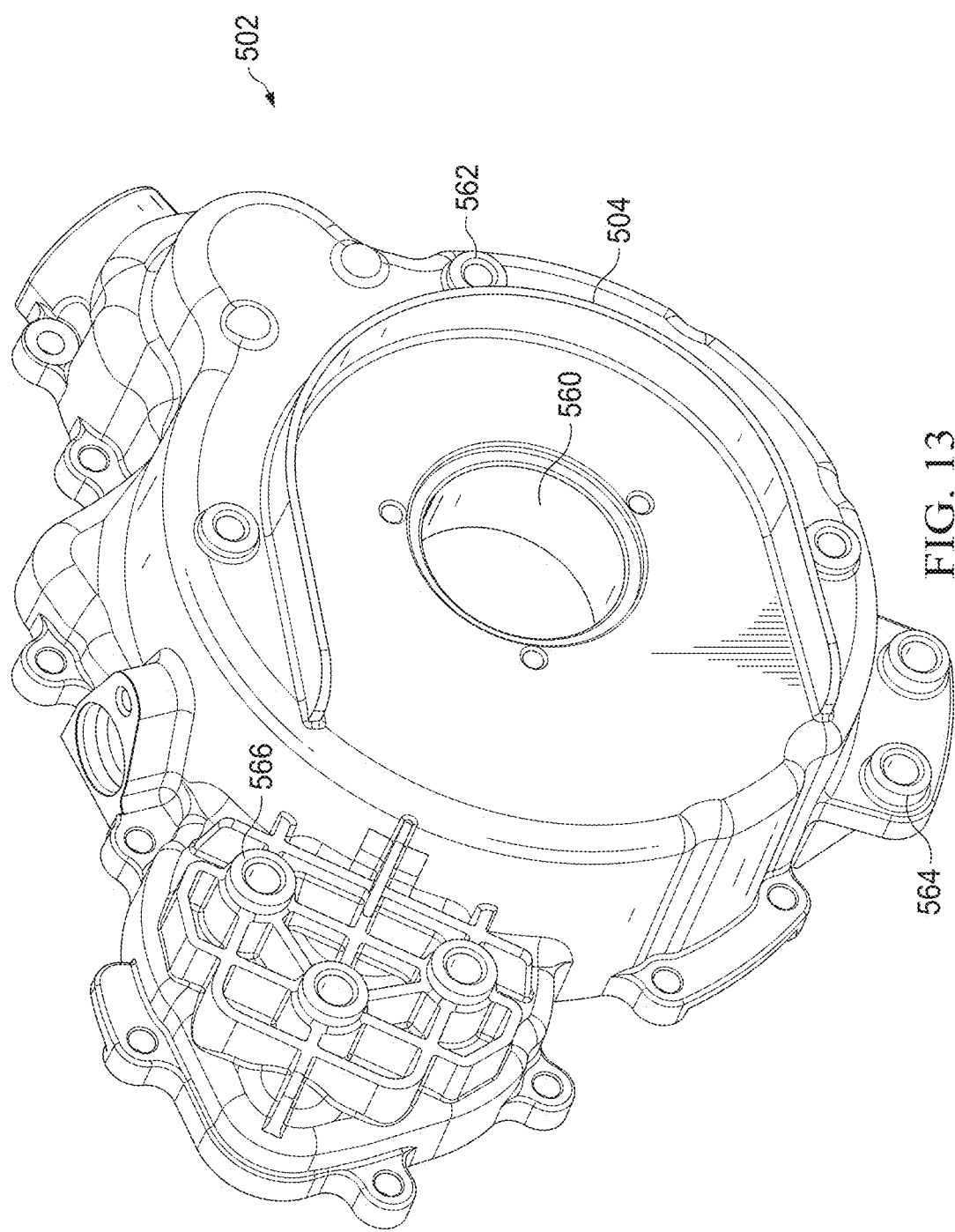
FIG. 13 is a view of another replacement housing.

FIG. 13 depicts the replacement housing 502 for covering an alternator having a stator and rotatable flywheel. Multiple designs of replacement housing 502 may be available, with each one configured to fit specific engine and associated alternator designs. This embodiment includes protective ridge 504 configured to surround a drive pulley.

The rotary drive access hole 560 is located within the protective ridge 504 and is configured to hold a drive shaft housing, which in turn supports the drive shaft for the drive pulley. Three drive mechanism mounts are located around the access hole 560. The drive shaft housing of a drive mechanism may be connected to these drive mechanism mounts. In some embodiments, the drive mechanism mounts may be threaded openings to accept a bolt or other connector. In other embodiments, the drive mechanism mounts may be holes designed to accept a screw, clip or other connector.

In some embodiments, the replacement housing 502 includes connector protrusions 562, 564 and 566. These connector protrusions 562, 564 and 566 surround openings that receive connectors, such as bolts, screws, clips, pegs or other connectors. The connector protrusions 562, 564 and 566 correspond with indentions or channels in a corresponding component, such as the top arm, the bottom arm, a cover or the enclosure. In some embodiments, the drive mechanism mounts may include connector protrusions. In some embodiments, the connector protrusions 562, 564 and 566 may be indentions that are designed to correspond to protrusions on a corresponding component. The incorporation of protrusions and corresponding indentions at the connections assists in aligning the components and increasing the strength of the connections. The engaged protrusions and indentions support the connection and significantly reduce the likelihood that a connector passing through the protrusions and indentions will shear.

In this embodiment, the connector protrusion 566 is shown in the position to connect to the top arm of the rotary drive system 500 along with two additional connector protrusions. In some embodiments, the connector protrusions connecting to the top arm may not correspond to all the connections between the top arm and the replacement housing 502. For example, some embodiments may include four connector openings and only two include connector protrusions 566. This embodiment also shows connector protrusion 564 in the position to connect to the bottom arm and connector protrusion 562 in a position to attach to the enclosure.

Figure 14:
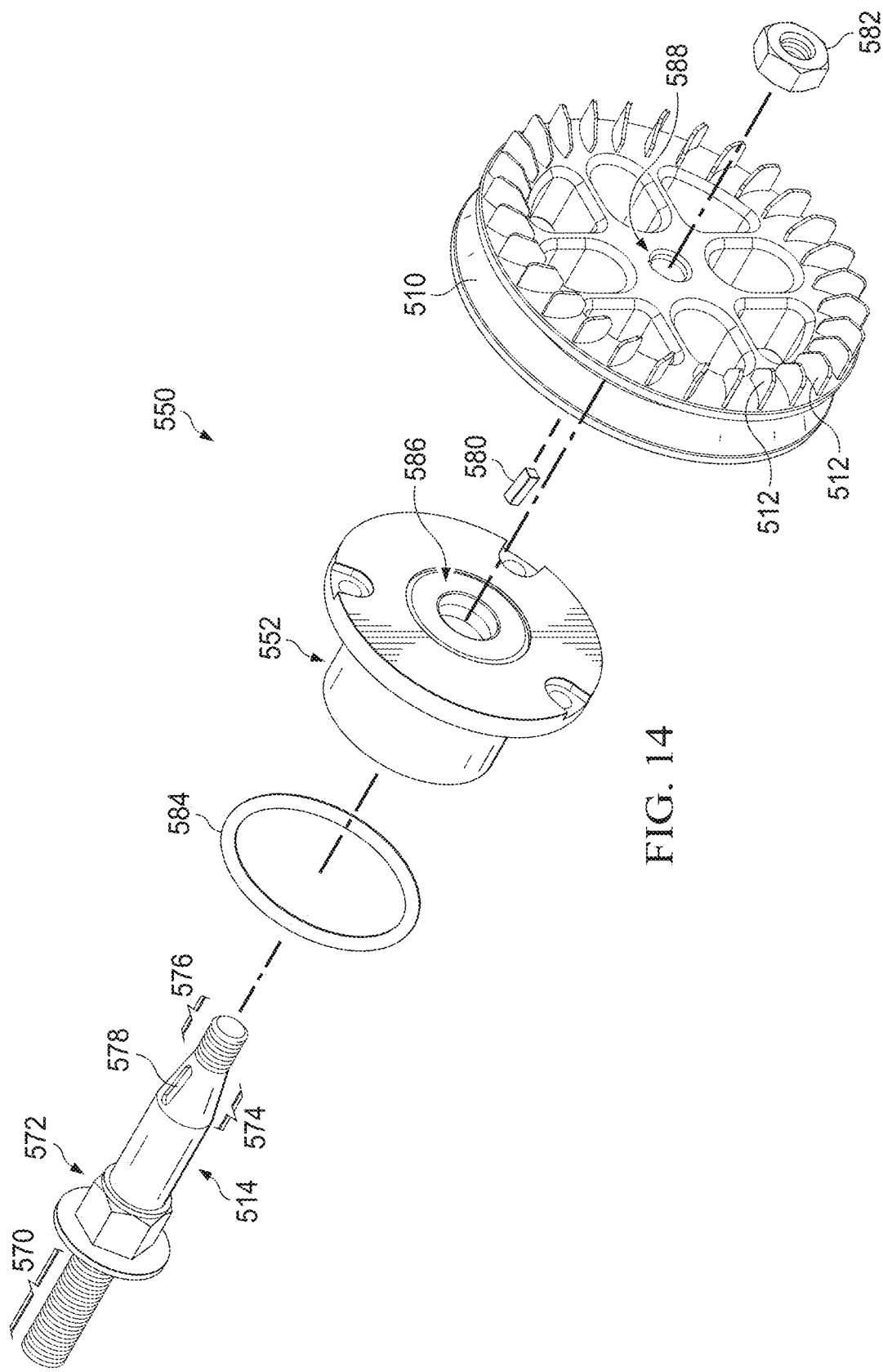
FIG. 14 is an exploded view of another drive mechanism.

FIG. 14 shows an exploded embodiment of the drive mechanism 550. The drive mechanism 550 includes a drive shaft 514, a drive shaft housing 552 and the drive pulley 510. The drive shaft 514 includes a threaded base 570 leading to a flange 572. The threaded base 570 may replace a bolt or other connector used to attach a flywheel to a rotary component of a vehicle. The drive shaft 514 extends to a cone section 574, which narrows to a threaded tip 576. The cone section 574 includes a channel or indention 578 into which a key 580 may fit.

The drive shaft housing 552 includes an opening 586 through which a portion of the drive shaft 514 passes. The opening 586 includes a rotary bearing, which abuts the drive shaft 514 and rotates with the drive shaft 514 during operation. A seal 584 fits on the drive shaft housing 552 and creates a seal between an alternator housing and the drive shaft housing 552 when installed.

The cone section 574 and threaded tip 576 extend through the drive shaft housing 552 and engage the drive pulley 510. The drive pulley 510 includes a drive pulley opening 588 that fits over the threaded tip 576 and engages the cone section 574. In some embodiments, the drive pulley opening 588 is a smaller diameter than the widest portion of the cone section 574. In some embodiments, the drive pulley opening 588 may have a corresponding conical shape to fit the cone section 574 of the drive shaft 514. In addition, the drive pulley opening 588 may include a notch or channel corresponding to the key 580. The key 580 fits into the drive shaft 514's indention 578 and the notch in drive pulley opening 588 to create a fitted connection that transfers the rotation from the drive shaft 514 to the drive pulley 510. The drive pulley 510 is fixed to the drive shaft 514 by tightening the nut 582 onto the threaded tip 576.

In some embodiments, the connection may not incorporate a key 580. For example, the drive shaft 514 may include a splined section that fits into corresponding channels in the drive pulley opening 588. As another example, the drive shaft 514 may include a polygonal shape that corresponds to the drive pulley opening 588.

Some embodiments of rotary drive systems may include a second accessory being driven by the drive mechanism 550. For example, the rotary drive system 500 may include a compressor and an alternator as accessories. The top arm or bottom arm may be modified to connect to and support another accessory having a pulley. In some embodiments, the second accessory may also be attached to the frame or other structure of the vehicle. In some embodiments, the replacement housing 502 may be modified to include connections for additional arms or other components.

A single drive belt may be wrapped around the drive pulley 510, the compressor's pulley and the second accessory's pulley to operate both accessory devices. In such a design, the rotary drive system may include multiple tensioners to apply and maintain tension on the drive belt. For example, the three pulleys may be in a triangle shape and tensioners may be placed along one or more legs of the triangle.

In other embodiments, the rotary drive system may include a double drive pulley with separate drive belts connecting from the double drive pulley to each accessory. In such embodiments, a tensioner may be associated with each drive belt.

Some embodiments of the two-accessory system may include an enclosure configured to prevent debris from entering the drive system. The enclosure may be designed to fit around the pulleys, tensioners and drive belt. The arms of the design may maintain a shape corresponding to the enclosure. Embodiments of the rotary drive system and the enclosure may be specifically configured to fit available space in specific vehicles. Other configurations may be designed for additional accessories. Some embodiments may incorporate alternative drive features to transfer rotary power to alternative components. For example, the drive mechanism may include a geared system with a geared drive shaft extending from the drive mechanism to an accessory device. In such a system, the accessory component may be further from the drive mechanism or in a location within the vehicle that is unsuitable for the drive belt.

Figure 15:
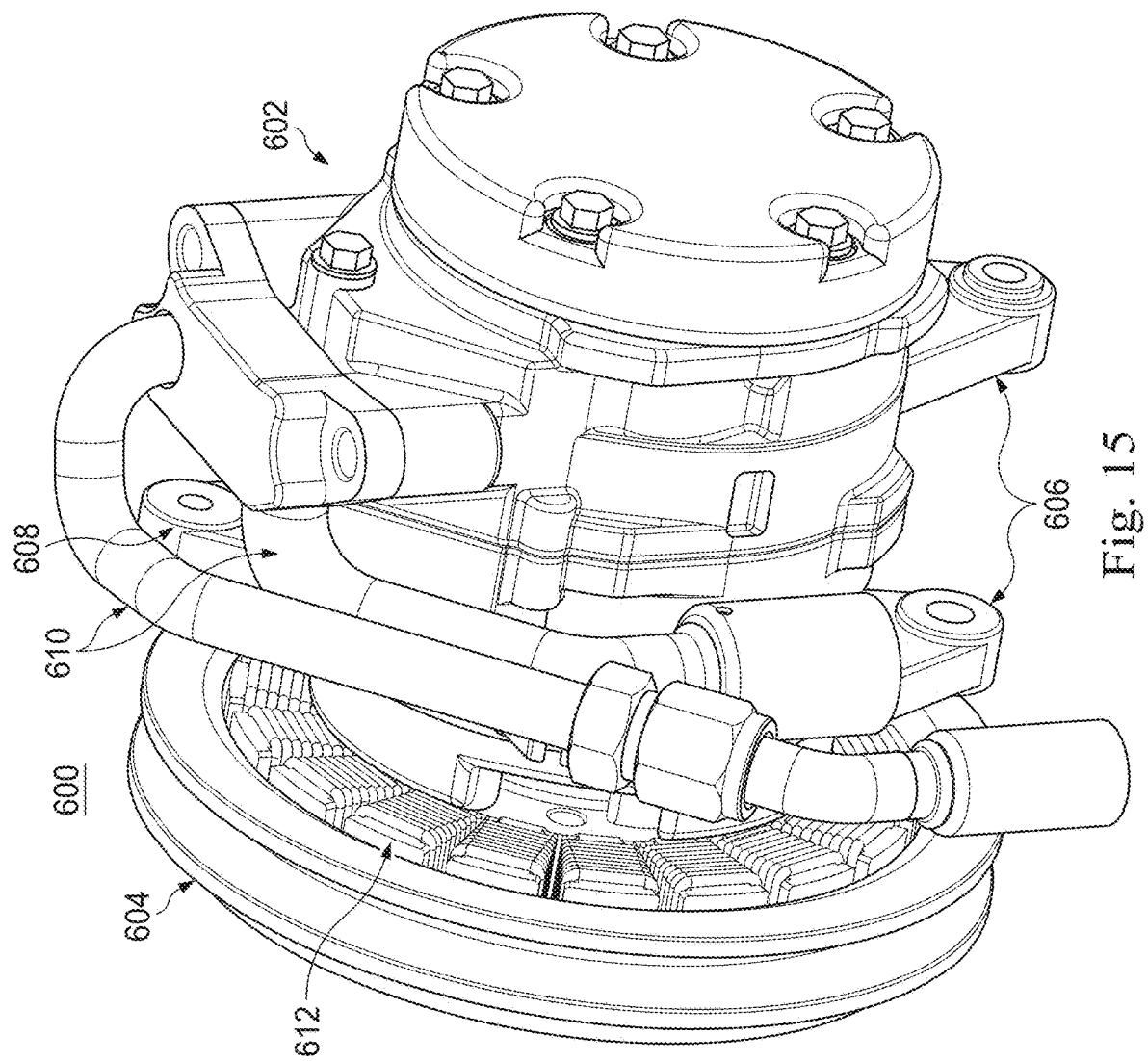
FIG. 15 is a view of a combination accessory.
Figure 16:
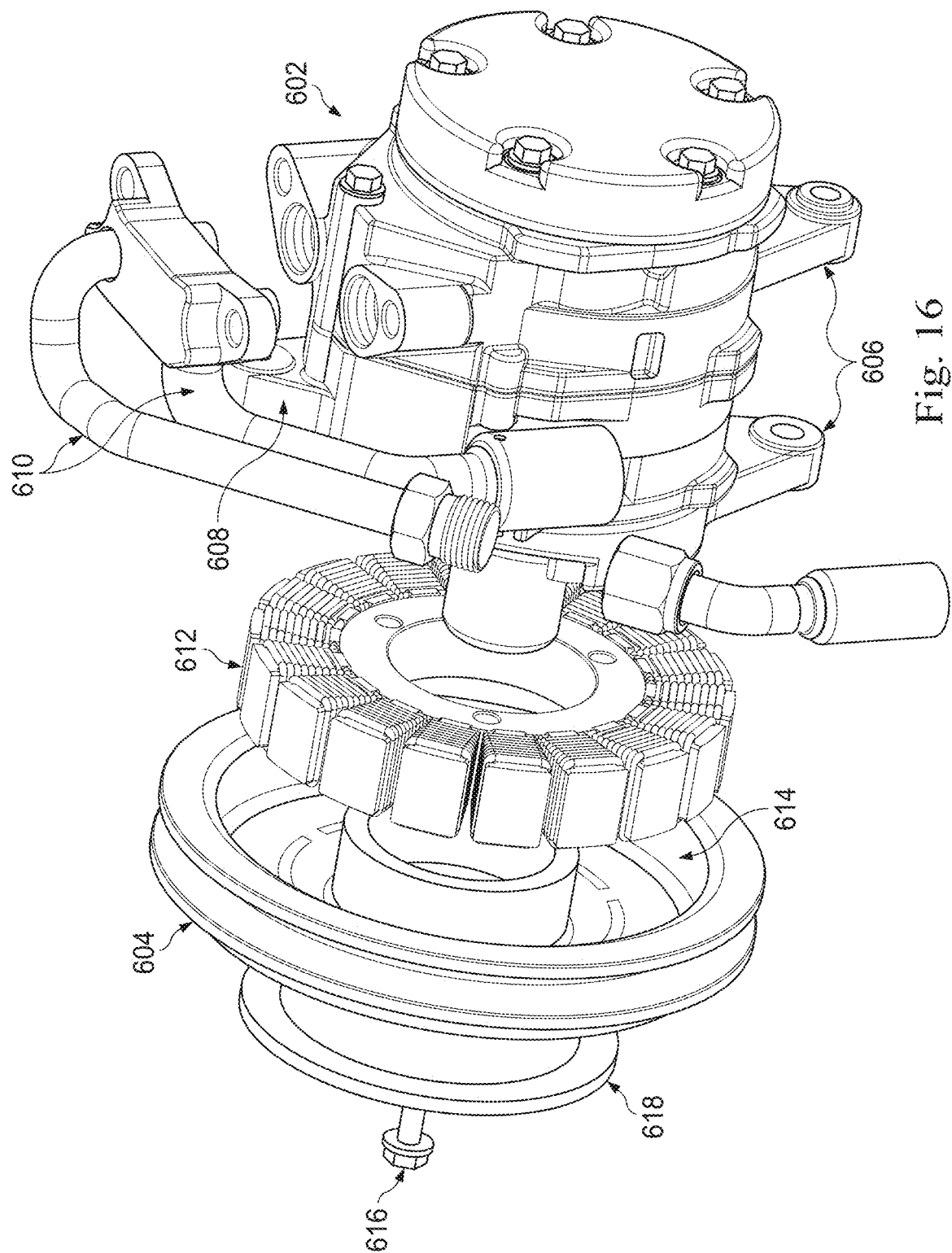
FIG. 16 is an exploded view of the combination accessory.
Figure 17:
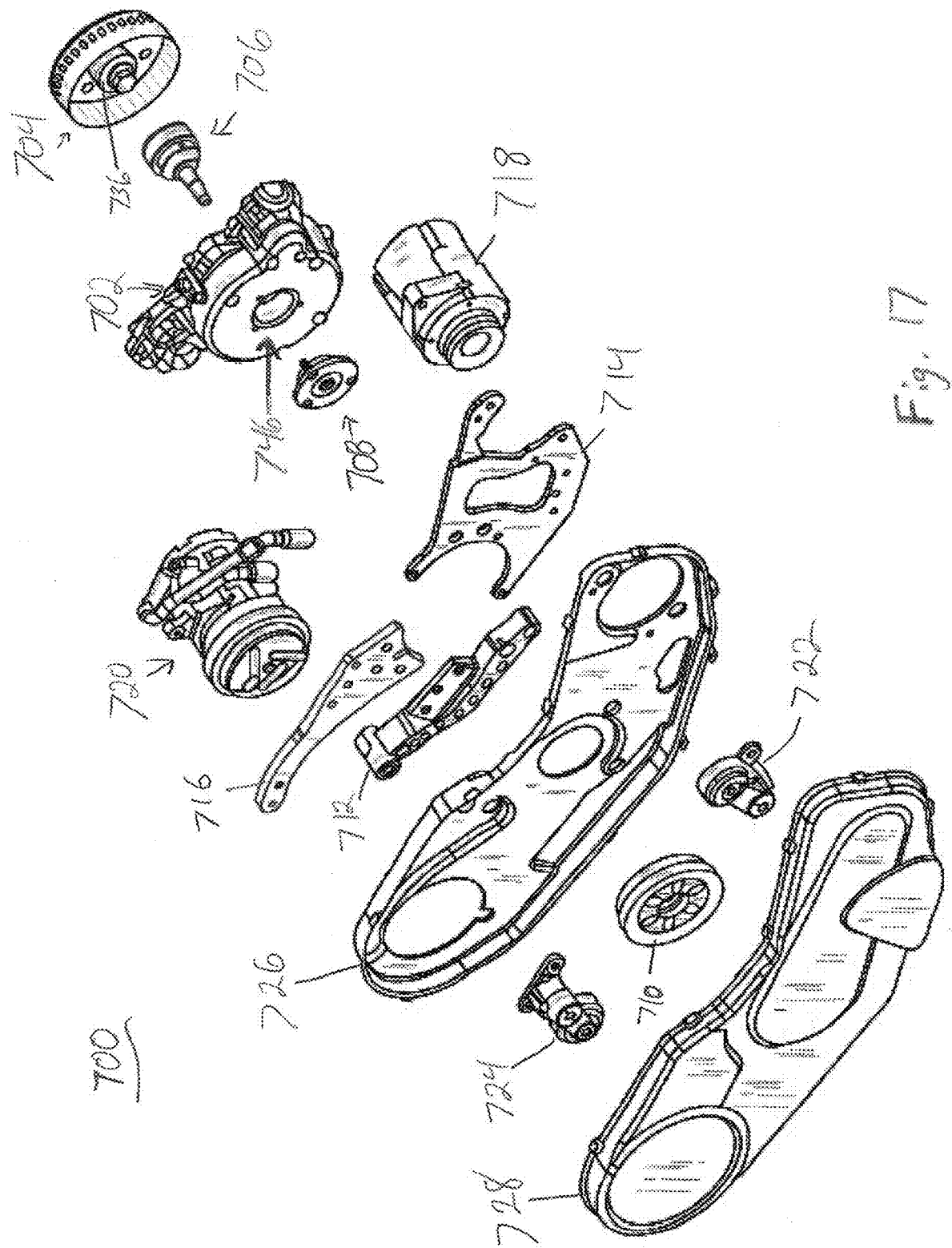
FIG. 17 is an exploded view of an embodiment of an assembly using a drive mechanism and an enclosure.

FIGS. 15 and 16 illustrate a combination accessory component 600. The combination accessory component 600 integrates an alternator into a compressor 602. The compressor pulley 604 rotates to power the compressor 602 and operates as a flywheel around a stator 612 to generate additional electricity.

The compressor 602 includes mounting brackets 606 and 608. The bottom mounting brackets 606 may be configured to attach to the end of a bottom arm of the rotary drive system. The top mounting bracket 608 may attach to a top arm of the rotary drive system. In addition, the compressor fluid tubes 610 are shown attached to the top of the compressor 602.

The compressor pulley 604 is attached to the compressor 602 with compressor drive shaft 616 and plate 618. The compressor drive shaft 616 may be a bolt, rod or other component that connects the compressor pulley 604 to the compressor 602. In some embodiments, the compressor drive shaft 616 may transfer rotary power from the compressor pulley 604 to the compressor 602. The plate 618 abuts the front of the compressor pulley 604.

In other embodiments, the compressor pulley 604 may directly connect to a rotary element of the compressor 602 to transfer rotary power, and the compressor drive shaft 616 may be designed to keep the compressor pulley 604 engaged with the compressor 602. For example, an inner wall of the compressor pulley 604 may engage a rotatable sleeve on the end of the compressor 602 with a splined design.

The compressor pulley 604 includes a channel 614 in which the stator 612 fits. The stator 612 is attached to the end of the compressor 602. The compressor pulley 604, in connection with the channel 614, operates as a flywheel around the stator 612 to form an alternator feature. Rotating the compressor pulley 604 around the stator 612 in the channel 614 creates electricity, which may be stored in a battery or other power storage device, or used to power electronic devices.

This accessory component 600 may be part of the rotary drive system 500 and connected to the drive mechanism 520 by the drive belt 524. The drive belt 524 may engage the compressor pulley 604 and transfer rotary motion to the compressor pulley 604.

FIGS. 17 through 21 illustrate another embodiment of an accessory rotary drive system 700, which powers additional components using rotary motion. The FIGS. 17-21 illustrate different views of the accessory rotary drive system 700, including the exploded view in FIG. 17, an assembled view in FIG. 18, a cross-sectional view in FIG. 19, an enlarged, cross-sectional view in FIG. 20 and the assembled view without an enclosure cover 728 in FIG. 21. The description of these figures will refer to referenced components throughout the accessory rotary drive system 700, though not all components are shown or detailed in every figure.

The accessory rotary drive system 700 is designed to use rotary power from an existing rotary drive 740 built into an existing rotary driven component. For example, the accessory rotary drive system 700 may use a rotary drive 740 from an existing alternator. In some embodiments, the existing components of the alternator, such as a flywheel, magneto, housing or other component, may be removed and replaced with components for the accessory rotary drive system 700.

In this embodiment, the accessory rotary drive system 700 includes a replacement rotary driven component housing 702 having a housing opening 746 there through. The component housing 702 may be an existing housing of the rotary driven component, which may be modified to include the housing opening 746, in some embodiments. When assembled, the component housing 702 is attached to a base 744 of the existing rotary driven component creating an enclosed area corresponding to the area enclosed within the pre-existing rotary driven component's base and housing.

This embodiment includes a rotary drum 704 having a central hub 736 with a connection opening, which fits over a stem of the existing rotary drive 740. In this embodiment, the rotary drum 704 is attached to the stem of the existing rotary drive 740 by the bolt 742. In some embodiments, the bolt 742 is the existing bolt from the existing rotary drive component, which has been removed and replaced after removing any unwanted existing components from the existing rotary drive component.

In this embodiment, the connection between the existing rotary drive 740 and the rotary drum 704 also includes key 748 fitting between corresponding key channels in the stem of the rotary drive 740 and the central hub 736. The bolt 742 keeps the central hub 736 engaged over the stem of the rotary drive 740 and the key 748 ensures the rotary drive 740's rotation turns the rotary drum 704. In some embodiments, the stem of the rotary drive 740 may include ridges, shapes or other features to engage the central hub 736.

The exterior of the central hub 736 includes threads, which are left-hand threaded in this embodiment. The threads may be counter-threaded to the bolt 742. The drive shaft 706 includes corresponding threads to attach to the central hub 736 to form a threaded connection 764.

The drive shaft 706 includes a first end section, a middle section and a second end section. The first end section includes a cap 760 and a connection flange 762. The connection flange 762 includes interior threads that form the threaded connection 764 with the exterior threads of the central hub 736. The cap 760 forms a cover over the head of the bolt 742 and extends into the connection flange 762. In this embodiment, the cap 760 includes at least one side hole that may accept a prong from a wrench to allow installation or removal of the drive shaft 706.

The middle section of the drive shaft 706 extends from the cap 760 to the second end section. The middle section passes through the drive shaft support 708 and the housing opening 746. The drive shaft support 708 includes a rotary bearing 754 and a seal 756 which support or abut the middle section of the drive shaft 706. The rotary bearing 754 provides support for the drive shaft 706 while limiting rotational drag. The seal 756 is configured to minimize movement of debris through the drive shaft support 708. In some embodiments, the area within the rotary component housing 702 may include an oil or other fluid, and the seal 756 may limit loss of the fluid through the drive shaft support 708.

The second end section of the drive shaft 706 begins at the opposite end of the middle section from the cap 760, which is beyond the drive shaft support 708 and the rotary component housing 702. In some embodiments, the second end section includes a second connector comprising a portion to engage a drive wheel and a locking portion to hold the drive wheel onto the connecting portion.

In this embodiment, the connecting portion is part of a conical section 768, which narrows from a wider diameter at the middle section to a narrower locking portion 766. The locking portion 766 is shown as a threaded tip in this section on which a threaded nut 772 fits and may be tightened to lock the drive wheel onto the conical section 768. In some embodiments, the locking portion 766 and nut 772 may be replaced with alternative locking features, such as clips, snap on heads, cotter pins or other connecting features. Those skilled in the art will recognize that locking portion 766 and threaded nut 772 illustrate structural components that are paired to form a locking connection.

The conical section 768 in this embodiment includes a keyed system including a key 770 fitting between a shaft channel in the conical section 768 and a wheel opening in the inverted conical opening 758 in the drive wheel. The key 770 engages sides of both the shaft channel and the wheel opening to ensure that the rotation of the drive shaft 706 causes the drive wheel to rotate. In some embodiments, the conical section 768 and conical opening 758 may be configured to different shapes that engage and ensure rotational engagement.

In this embodiment, the drive wheel is shown as a drive pulley 710 with two belt channels 750 and 752. A first belt 730 fits into the first belt channel 750 and extends to a second component pulley 734 for a second rotary driven component, which is illustrated as a compressor 720 in this embodiment. A first tensioner 724 is included to apply pressure to the first belt 730 between the drive pulley 710 and the second component pulley 734. The pressure applied by the first tensioner 724 is configured to maintain the first belt 730's engagement with the first pulley's belt channel 750 and the channel in the second component pulley 734.

A second belt 732 fits into the second belt channel 752 and extends to a third component pulley 780 for a third rotary driven component, which is illustrated as an alternator 718 in this embodiment. A second tensioner 722 is included to apply pressure to the second belt 732 between the drive pulley 710 and the third component pulley 780. Like the first tensioner 724, the second tensioner 722 applies pressure to the second belt 732 to maintain the second belt 732's engagement with the second pulley's belt channel 752 and the channel in the third component pulley 780.

The compressor 720 and the alternator 718 are structurally connected to the housing 702 by frame components, including arms 712 and 716 and extended frame 714. In this embodiment, the compressor 720 is connected by an upper arm 716 and a lower arm 712 to the housing 702. The arms 712 and 716 include holes that correspond to connection ports in the housing 702 and the compressor 720's body. Similarly, the extended frame 714 includes a series of holes configured to correspond with connection ports in the housing 702 and the alternator 718. In some embodiments, the frame components may include a series of connector hole designs that allow the same frame component to support different rotary components.

In some embodiments, frame bolts are used to connect the arms 712 and 716 or the extended frame 714 into the connection ports. In such embodiments, the connection ports may include pre-threaded openings or have integrated nuts corresponding to the frame bolts. In other embodiments, the connection ports may accept screws designed to cut threads during installation. Alternative connections may also be implemented to attach the frame components to the housing 702, the alternator 718 or the compressor 720. For example, the end connection of the lower arm 712 for the compressor 720 may be a rotatable connection comprising a tube that fits between two mounting brackets. When a bolt or pin extends through the mounting brackets and the tube connection located between the mounting brackets, it allows the compressor 720 to rotate relative to the lower arm 712. The compressor 720's position may be fixed by connection to the upper arm 716.

In this embodiment, the upper arm 716 and the extended frame 714 also include holes for connecting the first tensioner 724 and the second tensioner 722. These holes may be connection ports in some embodiments, allowing a connector to directly engage the upper arm 716 or the extended frame 714 without requiring any additional connector, such as a nut, cotter pin or other connector.

The compressor 720 and the alternator 718 may be fitted into compact spacing in an existing vehicle or other system. In some embodiments, these additional rotary components are fully supported by the frame components 712-716 and operated by the rotary power derived from an existing rotary drive 740 of the vehicle or system.

The system also includes an enclosure formed by an enclosure base 726 and an enclosure cover 728. The enclosure base 726 and the enclosure cover 728 are held together in this embodiment by a series of snap connectors 738 dispersed around the perimeter of the enclosure. The pulleys 710, 734 and 780, the tensioners 722 and 724, and the belts 730 and 732 are all positioned within the enclosure, which protects the rotary transfer system from debris, such as sand, dirt, rocks and other harmful particulate.

The enclosure base 726 may be connected to the housing 702 and the frame components 712-716 in some embodiments. The enclosure base 726 may include an opening for the face of the drive shaft support 708 and component openings for the compressor 720's body and the alternator 718's body to fit. In addition, tensioner holes may be included in the enclosure base 726 into which the frame of the tensioners 722 and 724 may fit for connection to the frame components 712-716. When installed, the various connection and component holes in the enclosure base 726 are configured to be filled by connectors and the components. In some embodiments, fittings may be used to fill any holes that are not used. As an example, if the selected alternator 718 required two connections through the enclosure base 726 even though three are available, a plug fitting may be used to seal the third opening. In addition, ring fittings may be used to facilitate sealing around alternatively sized accessory components. For instance, if the compressor 720 is replaced with a second alternator 718, a ring fitting may be required to fill any space between the size of the opening for the compressor 720 and the size of the alternator 718.

The following method of installation for the accessory rotary drive system 700 is described as part of a replacement of an existing alternator as the existing rotary drive component. Those skilled in the art will recognize that the accessory rotary drive system 700 may replace a variety of rotary driven components on a variety of vehicles or systems. The accessory rotary drive system 700 may connect to a rotary drive 740 from any source of rotational force, including crankshafts, combustion engines, electric engines, turbines and other rotary sources.

As an initial process, the installer may remove an existing rotary component housing, which covers the rotational component's operational features including the existing rotary drive 740. Once the component housing is removed, internal components, including the rotor and stator, may be removed. In order to remove the rotor from the stem of the existing rotary drive 740, the installer may have to pull the existing bolt 742.

Once the existing components are removed, the installer may place the rotary drum 704 onto the stem of the existing rotary drive 740. When placing the rotary drum 704, the installer will ensure the key 748 is in place on the stem and in line with the groove of the central opening of the central hub 736. The bolt 742 will then be reinserted and connected to the stem of the existing rotary drive 740. The head of the bolt 742 will hold the rotary drum 704 onto the stem of the rotary drive 704. In some embodiments, a washer will be included between the head of the bolt and the top of the central hub 736.

Next, the installer will attach the drive shaft 706 to the external threads of the central hub 736. The installer will fit the connection flange 762 to the top of the central hub 736 and rotate the drive shaft 706 to engage the threads of the central hub 736 and the connection flange 762. The drive shaft 706 may be tightened into place with a pin spanner wrench engaging a hole in the cap 760 of the drive shaft 706. In some embodiments, the formed threaded connection 764 is left-hand threaded and the drive shaft 706 is rotated counter-clockwise to tighten the drive shaft 706 to the central hub 736 of the rotary drum 704.

The rotary component housing 702 may be attached to the base 744 of the existing rotary driven component. When installed, the drive shaft 706 will extend through the housing opening 746 in the rotary component housing 702. The drive shaft support 708 will be installed between the housing opening 746 and the middle section of the drive shaft 706. An outer flange at the face of the drive shaft support 708 may be used to connect the drive shaft support 708 to the rotary component housing 702.

In some embodiments, the drive shaft support 708 may be attached to the rotary component housing 702 prior to installing the housing 702 onto the base 744. In such an installation, the drive shaft 706 will be guided through the drive shaft support 708 prior to connecting the housing 702 to the base 744.

The installer may next connect the frame components 712-716 and the accessory components for the system. For example, the installer may connect the lower arm 712 and the upper arm 716 to the housing 702. With the arms 712 and 716 in place, the compressor 720 may be attached with mounting brackets to the tube connection on the lower arm 712. Then the compressor 720 may be rotated to the correct position to attach the upper arm 716 to the compressor 720. The extended frame 714 may be installed on the opposite side of the housing 702 from the upper and lower arms 712 and 716. Once the extended frame 714 is connected, the alternator 718 may be attached.

In this case, the accessory components are shown as alternator 718 and compressor 720. The compressor 720 will facilitate the ability to provide air conditioning options to the vehicle or system that would not otherwise be available.

In addition, the accessory alternator 718 may be configured to replace the power output of the original alternator, which was disassembled to attach the accessory rotary drive system 700. In some embodiments, the alternator 718 may provide higher efficiency or output to further increase overall electric power output for the vehicle. In some embodiments, an alternative drum 704 that includes magnets on the exterior wall may be used as the replacement rotor and a modified stator to fit the stator space in between the magnets and drive shaft 706. In such embodiments, the system may include two alternators—the modified existing alternator and the alternator 718—to further increase available electric power for additional vehicle features. In other embodiments, an alternative rotary driven component may replace the alternator 718.

With the housing 702 and accessory components 718 and 720 installed, the enclosure base 726 may be installed by connecting the enclosure base 726 to a plurality of points from the housing 702 and the frame connectors 712-716. The drive pulley 710, the first tensioner 724 and the second tensioner 722 may then be installed.

To install the drive pulley 710, the installer may place the key 770 in a shaft channel within the conical section 768 of the drive shaft 706. Then the wheel opening in the inverted conical opening 758 of the drive pulley 710 is aligned with the key 770, and fitted over the key 770. Finally, the locking connection is formed between the locking portion 766 and the nut 772.

In some embodiments, the tensioners 722 and 724 are installed before installing the belts 730 and 732. In some embodiments, the tensioners 722 and 724 are spring tensioners that allow flexing during operation. In other embodiments, they may be fixed tensioners that may be set at a defined location and do not flex during operation. When tensioners 722 and 724 are installed before the belts 730 and 732, the tensioning wheels may be moved to reduce or remove tension during installation.

With the tensioning wheel of the second tensioner 722 pulled back, the installer may place the second belt 732 onto the pulley channel 752 and over the alternator pulley 780. The second tensioner 722 is then allowed to apply pressure to the second belt 732.

Once the second belt 732 is in place in the back pulley channel 752, the first belt 730 may be installed in the forward pulley channel 750. The tensioning wheel of the first tensioner 724 is pulled back and the first belt 730 is installed between the pulley channel 750 and the compressor pulley 734. The second tensioner 722 is then allowed to apply pressure to the second belt 732.

Finally, the enclosure cover 728 may be attached to the enclosure base 726 using the latches 738. In other embodiments, the latches 738 may be replaced or augmented with additional connectors, such as screws, bolts, clips or other connectors.

The invention being thus described and further described in the claims, it will be obvious that the same may be varied in many ways. Such variations are not to be regarded as a departure from the spirit and scope of the invention, and all such modifications as would be obvious to one skilled in the art are intended to be included within the scope of the apparatus described.

The invention claimed is:

1. A rotary drive system for connecting to an existing rotary drive for an existing rotary driven component, the rotary drive system comprising:
   a. a rotary drum having a central hub with a drum connector, wherein the central hub fits over a stem of the existing rotary drive, the central hub is operably connected to the existing rotary drive by a stem connector engaging the stem of the existing rotary drive;
   b. a drive shaft having a first end section, a middle section and a second end section, wherein
      i. the first end section includes a connecting flange with a drive shaft connector that corresponds to the drum connector of the central hub and forms a drive shaft connection, wherein the drive shaft rotates based on rotation of the central hub and the drive shaft connection,
      ii. the middle section extends between the connecting flange and the second end section, and
      iii. the second end section includes a second connector;
   c. a drive shaft support configured to support the drive shaft during the operation; and
   d. a drive wheel secured to the second end of the drive shaft, wherein the drive wheel rotates with the drive shaft during operation and is configured to link with a second component that is driven by rotary movement.

2. The rotary drive system of claim 1, wherein the second connector comprises a shaft channel configured to accept a key, and the drive wheel comprises a wheel opening, which corresponds to the second end of the drive shaft and includes an extended channel that fits over the key.

3. The rotary drive system of claim 2, wherein the second end section includes a conical section narrowing in diameter from the middle section to a threaded portion of the second end section, wherein the shaft channel is in the conical section and a nut is configured to fit on the threaded portion to hold the drive wheel on the drive shaft.

4. The rotary drive system of claim 1, wherein the drive wheel is a drive pulley and a first drive belt extends to the second component.

5. The rotary drive system of claim 4, comprising a first tensioner that is between the drive pulley and the second component and applies pressure to the first belt during operation.

6. The rotary drive system of claim 1, wherein the second component is connected to the replacement housing by an upper arm and a lower arm.

7. The rotary drive system of claim 1, wherein the second component is one of a condenser, an alternator, a hydraulic pump and a generator.

8. A drive mechanism, comprising:
   a. a drive shaft having a first end section, a middle section and a second end section, wherein
      i. the first end section includes a connecting flange, wherein the connecting flange forms a drive shaft connection with a central hub, wherein the drive shaft rotates based on rotation of the central hub and the drive shaft connection,
      ii. the middle section extends between the cap and the second end section, wherein the middle section passes through a component housing, and
      iii. the second end extending from the middle section and having a conical section configured to engage a drive wheel opening and cause the drive wheel to rotate based on the rotation of the central hub and the drive shaft connection.

9. The drive mechanism of claim 8, wherein the drive wheel connects to a second component by a drive belt, and wherein rotation of the drive wheel during operation drives the second component.

* * * * *